(12) United States Patent
Walters et al.

(10) Patent No.: US 11,392,603 B1
(45) Date of Patent: Jul. 19, 2022

(54) DATABASE REST API

(71) Applicant: Amazon Technologies, Inc., Seattle, WA (US)

(72) Inventors: Matthew Walters, Seattle, WA (US); Brian Welcker, Seattle, WA (US); Dennis Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 599 days.

(21) Appl. No.: 15/478,001

(22) Filed: Apr. 3, 2017

(51) Int. Cl.
| | |
|---|---|
| *G06F 16/248* | (2019.01) |
| *H04L 9/40* | (2022.01) |
| *G06F 21/60* | (2013.01) |
| *G06F 21/62* | (2013.01) |
| *G06F 16/955* | (2019.01) |
| *H04L 67/02* | (2022.01) |

(52) U.S. Cl.
CPC .......... *G06F 16/248* (2019.01); *G06F 16/955* (2019.01); *G06F 21/604* (2013.01); *G06F 21/6218* (2013.01); *H04L 63/0281* (2013.01); *H04L 63/08* (2013.01); *H04L 67/02* (2013.01)

(58) Field of Classification Search
CPC ................ G06F 16/248; G06F 21/604; G06F 21/6218; H04L 63/0281; H04L 63/08; H04L 67/02
See application file for complete search history.

(56) References Cited

U.S. PATENT DOCUMENTS

| | | | |
|---|---|---|---|
| 6,173,322 B1 * | 1/2001 | Hu | G06F 9/505 |
| | | | 709/217 |
| 6,549,934 B1 | 4/2003 | Peterson et al. | |
| 7,266,538 B1 * | 9/2007 | Shatil | G06F 12/0862 |
| 7,912,051 B1 | 3/2011 | Rowlands et al. | |
| 8,078,870 B2 * | 12/2011 | Nanda | H04L 63/08 |
| | | | 713/155 |
| 8,490,102 B2 | 7/2013 | Handlogten et al. | |

(Continued)

OTHER PUBLICATIONS

Fielding, R., et al., "Hypertext Transfer Protocol—HTTP/1.1," Request for Comments: 2616, Standards Track, Jun. 1999, 165 pages.

(Continued)

*Primary Examiner* — Robert W Beausoliel, Jr.
*Assistant Examiner* — Susan F Rayyan
(74) *Attorney, Agent, or Firm* — Davis Wright Tremaine LLP

(57) ABSTRACT

A database proxy server provides a web service interface such as a representational state transfer ("REST") interface to a relational database. The proxy server maps a request submitted via the web service interface to a database interface. In some examples, the web service interface is a stateless REST interface that maps particular SQL statements or subroutines to a request submitted via a particular URL. A web client is able to pass parameters with a request using either URL encoding (the GET method) or within the body of the request (the POST method). The proxy server generates one or more database commands that correspond to the request. The database commands are submitted to the relational database, and the relational database performs the database commands to fulfil the request.

20 Claims, 24 Drawing Sheets

(56) References Cited

U.S. PATENT DOCUMENTS

| | | | | |
|---|---|---|---|---|
| 8,554,762 | B1* | 10/2013 | O'Neill | G06F 16/27 707/715 |
| 8,745,076 | B2* | 6/2014 | Pazdziora | G06F 16/242 707/760 |
| 8,793,804 | B2* | 7/2014 | Bekker | H04L 63/08 726/26 |
| 8,966,112 | B1* | 2/2015 | Franke | H04L 69/14 709/235 |
| 9,450,860 | B2* | 9/2016 | Averbuj | H04L 67/327 |
| 9,514,328 | B2 | 12/2016 | Cotner et al. | |
| 10,182,074 | B2* | 1/2019 | Burch | H04L 63/08 |
| 10,268,722 | B2* | 4/2019 | Ratcliff | G06F 16/256 |
| 10,552,442 | B1* | 2/2020 | Lusk | G06F 16/284 |
| 2002/0188616 | A1 | 12/2002 | Chinnici et al. | |
| 2002/0199017 | A1* | 12/2002 | Russell | H04L 45/00 709/243 |
| 2003/0167317 | A1* | 9/2003 | Deen | H04L 29/06 709/219 |
| 2004/0215787 | A1* | 10/2004 | Gibson | H04L 47/10 709/227 |
| 2005/0038873 | A1 | 2/2005 | McCarthy | |
| 2005/0246338 | A1 | 11/2005 | Bird | |
| 2005/0262572 | A1 | 11/2005 | Yoneyama | |
| 2006/0168334 | A1* | 7/2006 | Potti | H04L 67/2814 709/239 |
| 2007/0005786 | A1* | 1/2007 | Kumar | H04L 45/563 709/230 |
| 2007/0005801 | A1* | 1/2007 | Kumar | H04L 63/08 709/238 |
| 2008/0097960 | A1 | 4/2008 | Dias et al. | |
| 2008/0235731 | A1 | 9/2008 | Bryant et al. | |
| 2009/0019517 | A1 | 1/2009 | Turakhia | |
| 2009/0260066 | A1* | 10/2009 | Miller | G06F 21/41 726/8 |
| 2010/0023491 | A1* | 1/2010 | Huang | H04L 41/28 707/E17.014 |
| 2010/0145946 | A1* | 6/2010 | Conrad | G06F 16/2452 707/736 |
| 2010/0185645 | A1 | 7/2010 | Pazdziora | |
| 2011/0276550 | A1 | 11/2011 | Colle et al. | |
| 2012/0140675 | A1* | 6/2012 | Mishra | H04L 41/5038 370/254 |
| 2012/0158765 | A1 | 6/2012 | Kumar et al. | |
| 2012/0159595 | A1 | 6/2012 | Barham | |
| 2012/0179787 | A1 | 7/2012 | Walsh et al. | |
| 2012/0221519 | A1 | 8/2012 | Papadomanolakis et al. | |
| 2012/0260330 | A1* | 10/2012 | Zlatarev | G06F 21/33 726/10 |
| 2013/0133059 | A1* | 5/2013 | Maman | H04L 63/102 726/12 |
| 2014/0143199 | A1 | 5/2014 | Allen et al. | |
| 2014/0214890 | A1 | 7/2014 | Johnson | |
| 2014/0244818 | A1* | 8/2014 | Taine | H04L 65/40 709/223 |
| 2014/0269296 | A1 | 9/2014 | Khaddam | |
| 2015/0046487 | A1 | 2/2015 | Yamada | |
| 2015/0095343 | A1* | 4/2015 | Divilly | H04L 67/28 707/741 |
| 2015/0113614 | A1* | 4/2015 | Sarkuni | H04L 63/08 726/5 |
| 2015/0248457 | A1 | 9/2015 | Sawaf | |
| 2015/0271271 | A1* | 9/2015 | Bullotta | H04L 67/141 709/228 |
| 2015/0286394 | A1* | 10/2015 | Koval | H04L 67/06 713/156 |
| 2015/0381623 | A1* | 12/2015 | Mattson | H04L 63/0892 726/4 |
| 2016/0088023 | A1* | 3/2016 | Handa | G06F 16/957 726/1 |
| 2016/0218963 | A1 | 7/2016 | Nauck et al. | |
| 2016/0285876 | A1 | 9/2016 | Perez et al. | |
| 2016/0299936 | A1* | 10/2016 | Chavda | H04L 67/02 |
| 2016/0366220 | A1* | 12/2016 | Gottlieb | H04L 69/08 |
| 2017/0003998 | A1 | 1/2017 | Kelly et al. | |
| 2017/0005873 | A1* | 1/2017 | Strandzhev | G06F 9/45558 |
| 2017/0116615 | A1 | 4/2017 | Burgess et al. | |
| 2017/0235716 | A1* | 8/2017 | Arrowood | G06F 17/2288 704/8 |
| 2017/0245298 | A1 | 8/2017 | Demange et al. | |
| 2017/0293501 | A1* | 10/2017 | Barapatre | G06F 9/45558 |
| 2017/0323111 | A1 | 11/2017 | Hernandez Gonzalez et al. | |

OTHER PUBLICATIONS

Fielding, R., and J. Reschke, "Hypertext Transfer Protocol (HTTP/1.1): Message Syntax and Routing," Request for Comments: 7230, Standards Track, Jun. 2014, 90 pages.

Fielding, R., and J. Reschke, "Hypertext Transfer Protocol (HTTP/1.1): Semantics and Content," Request for Comments: 7231, Standards Track, Jun. 2014, 95 pages.

Fielding, R., and J. Reschke, "Hypertext Transfer Protocol (HTTP/1.1): Conditional Requests," Request for Comments: 7232, Standards Track, Jun. 2014, 29 pages.

Fielding, R., et al., "Hypertext Transfer Protocol (HTTP/1.1): Range Requests," Request for Comments: 7233, Standards Track, Jun. 2014, 26 pages.

Fielding, R., et al., "Hypertext Transfer Protocol (HTTP/1.1): Caching," Request for Comments: 7234, Standards Track, Jun. 2014, 44 pages.

Fielding, R., and J. Reschke, "Hypertext Transfer Protocol (HTTP/1.1): Authentication," Request for Comments: 7235, Standards Track, Jun. 2014, 20 pages.

"Connection Pool," Wikipedia, The Free Encyclopedia, May 20, 2016, <https://en.wikipedia.org/wiki/Connection_pool> [retrieved Mar. 30, 2014], 2 pages.

"Proxy for Database Server/Connection?," serverfault.com, Sep. 23, 2010, <http://serverfault.com/questions/184066/proxy-for-database-server-connection> [retrieved Mar. 30, 2017], 2 pages.

Vaqqas, M., "RESTful Web Services: A Tutorial," Dr. Dobbs.com, Sep. 23, 2014, <http://www.drdobbs.com/web-development/restful-web-services-a-tutorial/240169069> [retrieved Mar. 30, 2017], 9 pages.

Stack Exchange, "How to query readonly replica in Always On cluster," Mar. 24, 2015, retrieved Oct. 17, 2019, from https://dba.stackexchange.com/questions/96000/how-to-query-readonly-replica-in-always-on-cluster, 5 pages.

Wilton et al., "Migrating Data Between Databases," U.S. Appl. No. 14/985,132, filed Dec. 30, 2014.

DNS, "Authoritative vs Recursive DNS Servers: What's the Difference?" Jul. 17, 2013, retrieved on Jun. 17, 2019, from http://social.dnsmadeeasy.com/blog/authoritative-vs-recursive-dns-servers-whats-the-difference, 4 pages.

Macgregor, "ARIEL—A Semantic Front-End to Relational DBMSs," Proceedings of 11th International Conference on Very Large Data Bases, Aug. 21, 1985, 11 pages.

Microsoft, "SQL Server Connection Pooling (ADO.NET)," Mar. 29, 2017, retrieved Jun. 19, 2019, from https://docs.microsoft.com/en-us/dotnet/framework/data/adonet/sql-server-connection-pooling, 8 pages.

Sheth et al., "Federated Database Systems for Managing Distributed, Heterogeneous, and Autonomous Databases," ACM Computing Surveys, Sep. 1990, 22(3):183-236.

The Dialog Corporation, "Successful Searching on Dialog," Jul. 1998, retrieved on Jun. 17, 2019, from https://ppair-my.uspto.gov/pair/DisplayReferencesIfwImage?objectId=JWTJL83JRXEAPX2&docPages=7&docDesc=Non%20Patent%20Literature&lang=DINO, 7 pages.

\* cited by examiner

DATABASE REST API

CROSS-REFERENCE TO RELATED APPLICATIONS

This application incorporates by reference for all purposes the full disclosure of co-pending U.S. patent application Ser. No. 15/477,989, filed concurrently herewith, entitled "DATABASE COMMAND REPLAY," co-pending U.S. patent application Ser. No. 15/478,010, filed concurrently herewith, entitled "DATABASE PROXY CONNECTION MANAGEMENT," and co-pending U.S. patent application Ser. No. 15/478,017, filed concurrently herewith, entitled "DATABASE PROXY, ".

BACKGROUND

Database servers are an important part of many modern computing environments. A database server retains information in an organized data store which is managed by a database service. For example, a business may use one or more database servers to retain client information, product information, supply chain data, and inventory information. Information retained in a particular database may be related to other information in the particular database or in other databases. If a business's needs change, database servers may need to be modified to retain additional information or to provide additional processing capability. Modification of a database server can be risky because of the vast amounts of valuable information involved, and also because of the difficulty of maintaining relationships between different portions of the retained data.

BRIEF DESCRIPTION OF THE DRAWINGS

Various techniques will be described with reference to the drawings, in which.

DETAILED DESCRIPTION

Figure 1:
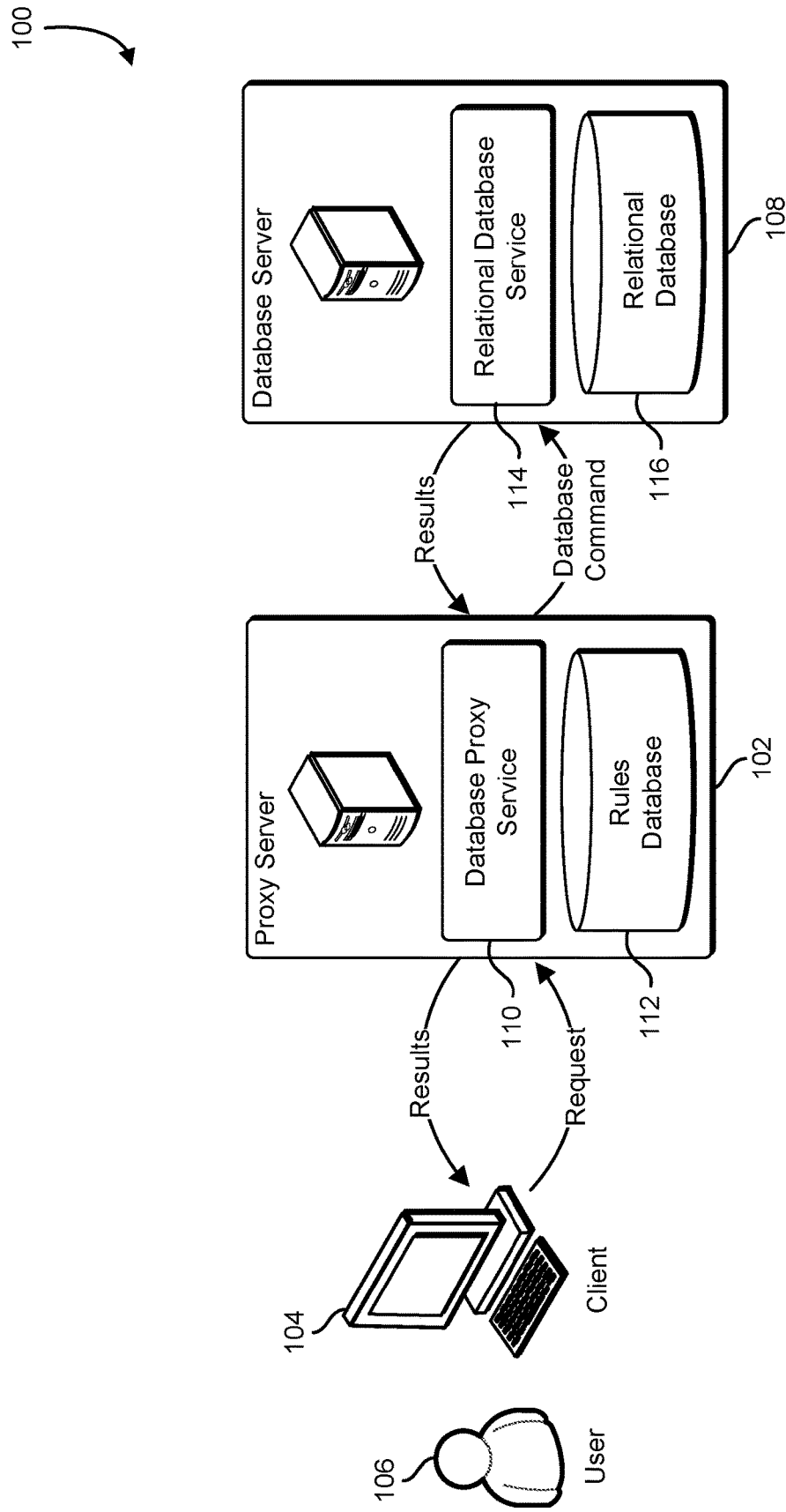
FIG. 1 shows an illustrative example of a system in which various embodiments may be practiced, according to one embodiment.

The present document describes embodiments, which a proxy server that modifies the operation of a database system by acting as an intermediary between a database client and a database server. In one embodiment, a request is sent by the database client to the proxy server, and the proxy server applies one or more rules to the request to produce a set of database commands. In one embodiment, the set of database commands is forwarded to the database server where the set of database commands is executed and produces results. In one embodiment, the database server returns the results to the proxy server, and the proxy server forwards the results to the database client. In one embodiment, the proxy server modifies the results using one or more applicable rules before providing the results to the database client. In one embodiment, a database client that is configured to communicate with the database server is redirected to communicate with the proxy server, and the proxy server provides an interface to the database client that is compatible with the database client while modifying the operation of the database server.

Rules may be provided to the proxy server in a variety of ways, according to various embodiments. In one embodiment, the rules are provided by database users and are submitted to the proxy server via a database client. In one embodiment, the rules are provided by the database administrator, and the rules are submitted to the proxy server via an administrative console connected to the proxy server. In one embodiment, each particular rule describes one or more conditions under which the particular rule is to be applied to a particular request. In one embodiment, a condition identifies a particular database user whose requests are subject to an associated rule. In one embodiment, a condition identifies a particular database client, and requests that originate from the particular database client are subject to an associated rule. In one embodiment, a condition describes a particular characteristic of a request, and requests that exhibit the particular characteristic are subject to a corresponding rule. In one embodiment, characteristics of the request may include a request type, a request command, or a request parameter. In one embodiment, a request identifies an action to be taken when the rule is applicable. In one embodiment, the action may describe passing a request to the database server, rejecting requests, routing a request to a particular database server, logging a request or modifying a request before forwarding the request to a database server. In one embodiment, the action may cause the proxy server to produce a corresponding set of database commands that are based at least in part on the request. In one embodiment, the action may cause the proxy server to modify a response that is returned from the database server before sending the response to the database client. In one embodiment, rules may be added, removed, or changed to alter the operation of the proxy server.

In one embodiment, the proxy server maintains a collection of persistent connections with one or more database servers. In one embodiment, the proxy server maintains a collection of non-persistent connections with one or more database servers. In one embodiment, the proxy server establishes a maximum number of connections with each available database server, and the proxy server acts as a throttle that limits a request-based workload that can be imposed on the available database servers. In one embodiment, the number of persistent connections maintained by the proxy server is limited by one or more databases or by a user. In one embodiment, the proxy server may include a request queue that stores incoming requests until an appropriate outbound connection is available. The proxy server may select a particular connection from the set of currently available connections based on a variety of criteria. In one embodiment, a particular connection is selected based on the predicted performance of each available connection. In one embodiment, a particular connection is selected based on an indication by a user, such as a preference score assigned to each connection by an administrator. In one embodiment, a particular connection is selected based on a cost metric associated with each connection.

The proxy server may, in some embodiments, provide a database client with an interface that is different from the interface provided by the database server. In one embodiment, the proxy server provides a representational state transfer (REST) interface to the database client, translates REST requests into Structured Query Language (SQL) statements, and submits the SQL statements to the database server. In one embodiment, responses from the database server are transformed into a REST response which is returned in the body of a hypertext transfer protocol ("HTTP") response. In one embodiment, by providing a REST interface, a database client no longer needs to maintain a persistent connection with the database. In one embodiment, the proxy server accepts requests via an HTTP get command, and request parameters are submitted within a uniform resource locator ("URL") associated with the request. In one embodiment, the proxy server accepts requests via an HTTP post command, and request parameters are submitted within the body of an HTTP request. In one embodiment, results obtained from a database server are relayed to the database client in the body of an HTTP response. In one embodiment, the proxy server provides a REST interface that converts a command and parameters into a corresponding set of SQL commands which are then submitted to a database server. In one embodiment, the proxy server provides a REST interface that accepts a sequence of SQL commands embedded within a REST request, and relays the SQL commands to a database server over a persistent database connection.

The proxy server may handle the translation of security credentials from the REST interface to the database server, according to some embodiments. In one embodiment, a database client provides credentials with a REST request. The proxy server authenticates the database client and authorizes the request based on the credentials. In one embodiment, the proxy server sends database commands corresponding to the request to a database server, and the database commands are authorized using a set of database credentials associated with the proxy server.

The proxy server may be used to improve the operation of the database in various embodiments. In one embodiment, the proxy service provides failover masking, which conceals a database failover event from applications. Failover masking may enable applications to either maintain connections to the database via the proxy server or transparently reconnect in the event of a loss of connectivity to the primary database. In one embodiment, the proxy server acts as a database query firewall which may monitor and prevent malicious applications from compromising the database server. In one embodiment, the proxy server performs read-load balancing which allows a customer to scale up a reporting fleet without requiring that applications connect to multiple read-only database endpoints. In one embodiment, the proxy server provides workload capture and replay features which allow a user to record transaction-ordered workloads from applications and replay them against a replica of the source system to test different database servers and configurations. In one embodiment, the proxy server provides data masking, which allows users to specify data level filters, so that even if an end-user has access to a sensitive data, selected data may be protected.

FIG. 1 shows an illustrative example of a system in which various embodiments may be practiced. A diagram 100 shows an embodiment of a proxy server 102 that acts as an intermediary between a client computer system 104 operated by user 106 and a database server 108. The proxy server may be a computer system, server cluster, or virtual computer system capable of hosting a database proxy service 110. The client computer system 104 may be a personal computer, notebook computer, a mobile device, a handheld device, a cell phone, or other computing device capable of establishing a communication channel with the proxy server 102. In one embodiment, the database server 108 is a relational database server ("RDS") where the proxy server 102 receives requests from the client computer system 104, translates the requests into a series of SQL database commands, and submits the database commands to the database server 108 over a persistent logical connection maintained by the proxy server 102. In one embodiment, the database server 108 produces results which are returned to the proxy server 102 over the logical connection and relayed to the client computer system 104 using a response channel associated with the request.

The proxy server 102 includes a database proxy service 110 and a rules database 112. In one embodiment, the database proxy service 110 is a service that processes incoming requests from database clients according to a set of rules retained in the rules database 112. In one embodiment, rules are provided that enable the proxy server 102 to modify, block, or pass particular requests to the database server 108. In one embodiment, rules may be provided by the user 106 or by an administrator of the proxy server 102. In one embodiment, a particular rule in the rules database 112 includes applicability logic that determines the situations where a rule is to be applied by the proxy server 102. Applicability logic may be based on properties of a particular request, properties of a database client that submitted the request to the proxy server 102, or properties of the user that authorized the request. In one embodiment, a particular rule describes an action to be performed on a request when the rule is determined to be applicable. In one embodiment, the action may be a pass-through action, a blocking action, a modification action, or other action.

The database server 108 includes a relational database service 114 that manages a relational database 116. In one embodiment, the relational database service 114 is a service that accepts SQL commands via an implementation-specific interface, and applies the SQL commands to information contained in the relational database 116. The relational database 116 may be a database maintained on the database server 108 or, in some embodiments, the relational database 116 may be a database maintained on a remote storage device that is accessible to the database server 108.

A logical connection may be established between the proxy server 102 and the database server 108 in a variety of ways. In one embodiment, the logical connection between the proxy server 102 and the database server 108 is a transmission control protocol ("TCP") connection established between the proxy server 102 and the database server 108. Database commands are sent over the logical connection from the proxy server 102 to the database server 108. The database server 108 executes the database commands and produces results which are returned over the logical connection to the proxy server 102. In one embodiment, a logical connection is established by creating an interprocess communication channel ("IPC") between the proxy server 102 and the database server 108. Database commands are transmitted from the proxy server 102 to the database server 108 via the IPC channel, and results are received in a response via the ICP channel.

In one embodiment, the client computer system 104 submits requests to the proxy server 102 via an HTTP connection in the form of a Web request. In one embodiment, results that are returned to the proxy server 102 by the database server 108 are returned to the client computer system 104 in the form of an HTTP response. In one embodiment, credentials submitted by the client computer system 104 with the Web request are used by the proxy server 102 to authenticate the client computer system 104 and authorizes the Web request. In one embodiment, if the proxy server 102 determines that the Web request is authorized, the proxy server submits corresponding database commands using database credentials controlled by the proxy server 102.

Figure 2:
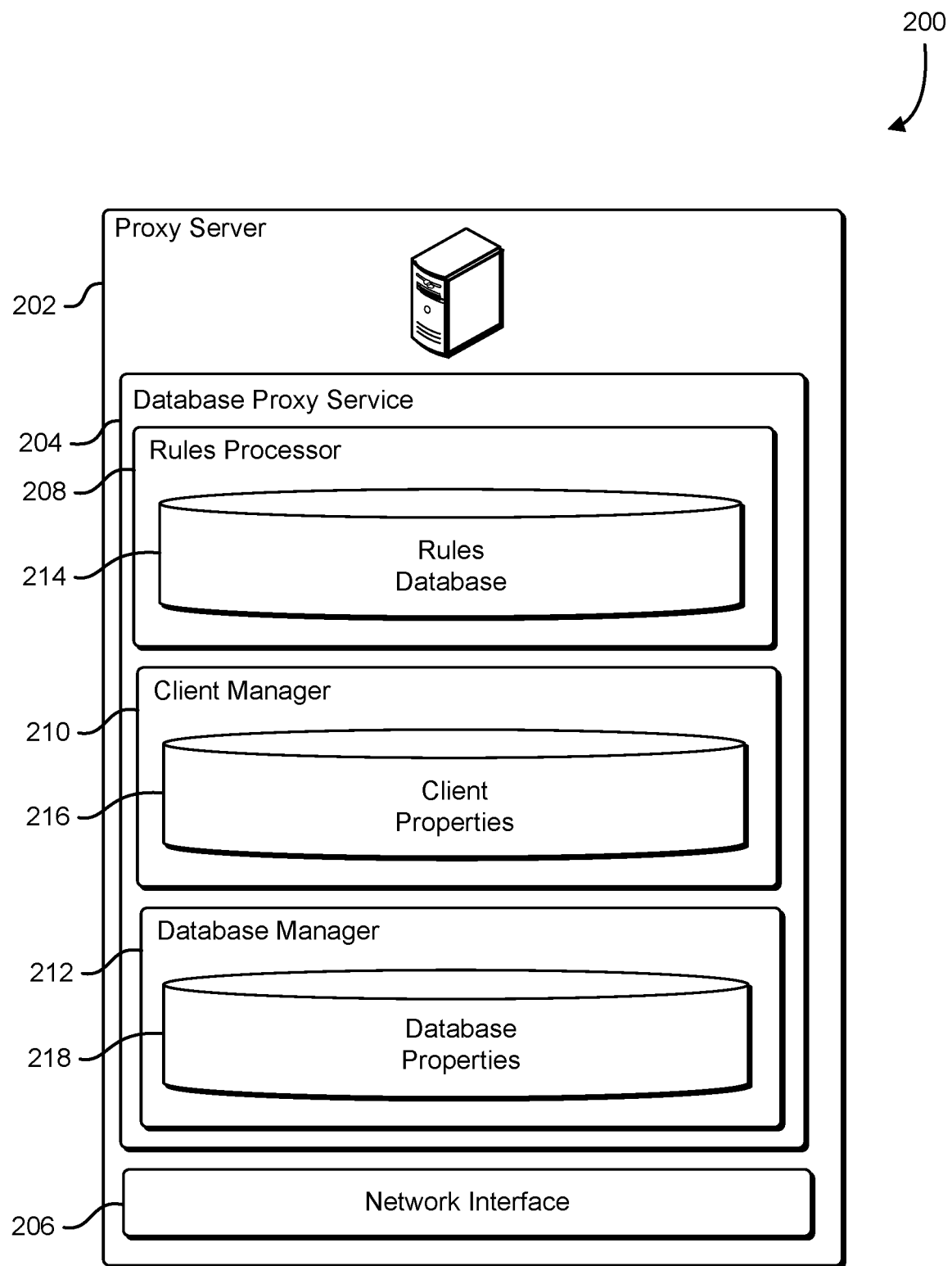
FIG. 2 shows an illustrative example of a proxy server that acts as an intermediary between a database server and a database client, according to one embodiment.

FIG. 2 shows an illustrative example of a proxy server that acts as an intermediary between a database server and a database client. A block diagram 200 illustrates an architecture for an embodiment of a proxy server 202. In one embodiment, the proxy server 202 is a computer system, virtual computer system, network appliance, or server cluster. In one embodiment, the proxy server hosts a database proxy service 204 and a network interface 206. In one embodiment, the database proxy service 204 is a service that receives requests from database clients, processes the requests in accordance with a set of rules that configure the operation of the proxy server 202, and submits a corresponding set of database commands to a database server. In one embodiment, results from the database server are returned to the database clients via the proxy server 202, and the proxy server 202 may modify the results in accordance with the set of rules.

The database proxy service 204 includes a rules processor 208, a client manager 210, and a database manager 212. In one embodiment, the rules processor 208 maintains a rules database 214 that retains rules which define the operation of the database proxy service 204. In one embodiment, each rule in the rules database 214 defines a set of applicability logic and an action. In one embodiment, the applicability logic determines when each particular rule is to be applied, and the action describes the action to be performed by the database proxy service 204 when the particular rule is found to be applicable. In one embodiment, rules may be provided by database users or database administrators, and facilitate configurability of the database proxy service 204. In one embodiment, the client manager 210 maintains a database of client properties 216. In one embodiment, database clients are registered with the database proxy service 204, and properties of each database client are retained in the database of client properties 216. In one embodiment, client properties may include a client name, a network address, a client software version, client access rights, and a physical location of the client. In one embodiment, the database manager 212 maintains a list of database properties 218. In one embodiment, for each database server used by the database proxy service 204, the database proxy service 204 may record information that includes a network address for the database server, an interface version for the database server, a software version associated with the database server, a schema used by the database server, and access credentials used by the database proxy service 204 to access the database server.

The proxy server 202 includes a network interface 206. In one embodiment, the network interface 206 provides a physical interface to one or more networks that are connected to one or more database clients and one or more database servers for which the database proxy service 204 acts as an intermediary. In one embodiment, the database proxy service acts as a network listener on a network port via the network interface 206, and requests are received from one or more database clients via the network port. In one embodiment, the database proxy service establishes a number of connections to each network server for which the database proxy service 204 acts as an intermediary. In one embodiment, when the database proxy service 204 receives a request from a database client, the database proxy service 204 establishes a network connection to a database server via the network interface 206 and sends a series of database commands to the database server via the network connection. In one embodiment, when the database proxy service 204 receives a request from a database client, the database proxy service 204 acquires a logical network connection from a pool of active connections maintained by the database proxy service 204, uses the logical connection to fulfill the request, and then returns the logical connection to the pool of active connections.

Figure 3:
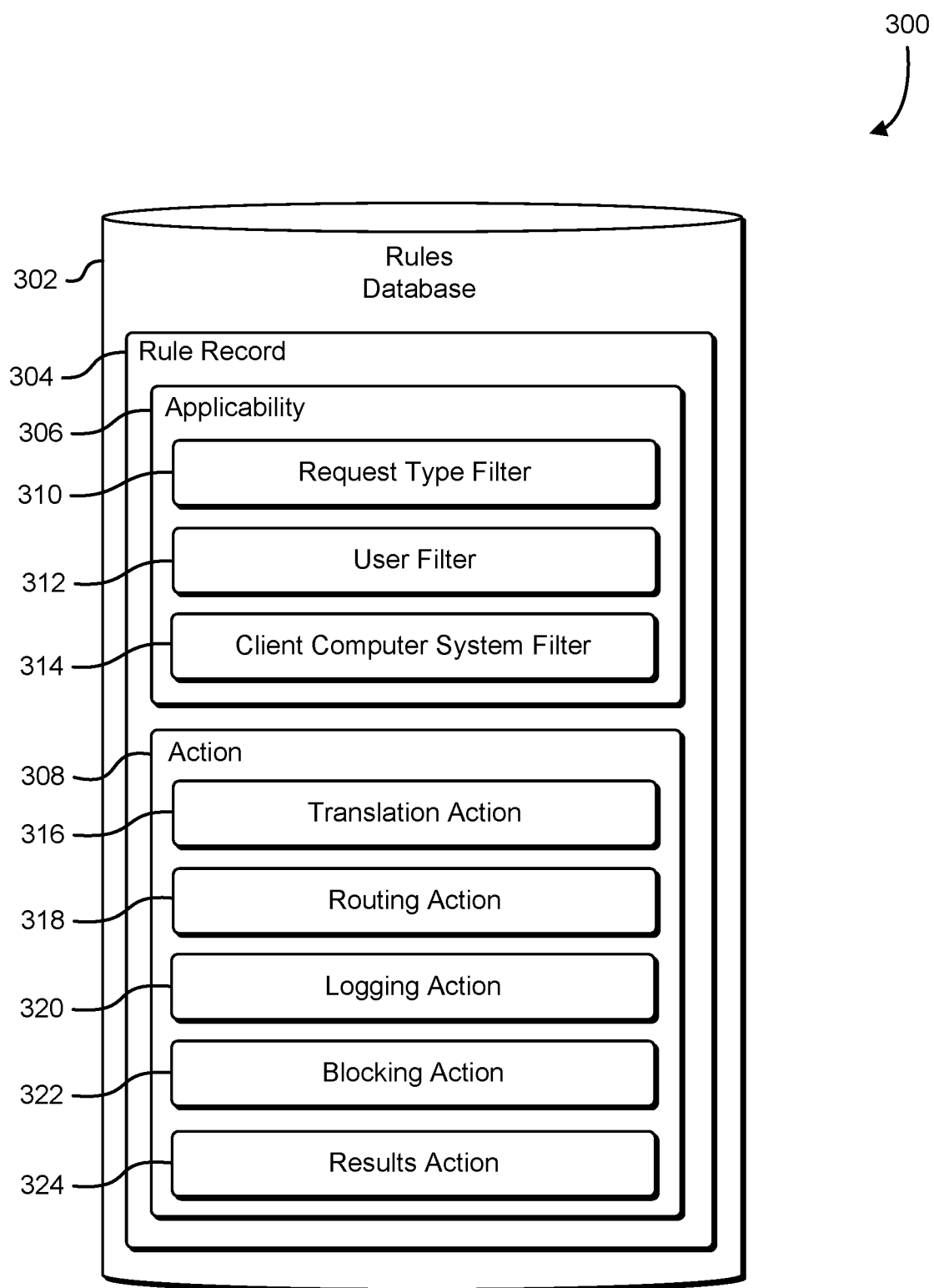
FIG. 3 shows an illustrative example of a rules database holding a set of user-defined rules that describe operations performed by a proxy server, according to one embodiment.

FIG. 3 shows an illustrative example of a rules database holding a set of user-defined rules that describe operations performed by a proxy server. A block diagram 300 illustrates a schema for embodiments of a rules database 302 capable of holding a collection of rule records. In one embodiment, a rule record 304 includes a set of applicability fields 306 and a set of action fields 308. In one embodiment, the rule record 304 includes an identifier such as a name, alphanumeric identifier, or numerical identifier for the rule.

The set of applicability fields 306 describes when the rule represented by the rule record 304 is to be applied by a database proxy service. In one embodiment, the set of applicability fields 306 includes a request type filter 310, a user filter 312, and a client computer system filter 314. In one embodiment, the request type filter 310 identifies one or more incoming request types to which the rule is to be applied. In one embodiment, request types may include pass-through types, database-query types, database-schema-change types, database-data-add types, or database-data-delete types. In one embodiment, the user filter 312 identifies one or more users whose requests are to be processed with the rule. In one embodiment, the user filter 312 identifies a particular user, and when a request is submitted to the proxy server from the particular user, the rule is applied. In one embodiment, the client computer system filter 314 identifies one or more client computer systems. In one embodiment, if a request is submitted from a particular client computer system identified by the client computer system filter 314, the rule is applied.

The set of action fields 308 describes actions performed by the database proxy service when a particular rule represented by the rule record 304 is applied. In one embodiment, the set of action fields 308 includes a translation action field 316, routing action field 318, a logging action field 320, a blocking action field 322, and a results action field 324. In one embodiment, the translation action field 316 describes a modification to an incoming request that produces a sequence of database commands for fulfilling the request. In one embodiment, the modification is described using a script. In one embodiment, the modification is described as a name of a SQL stored procedure. A stored procedure is a sequence of SQL-based instructions stored on a database server, in precompiled or source form, that are identifiable and executable by providing an identifier. In one embodiment, stored procedures may provide greater efficiency by avoiding the submission and recompilation of source code to the database server. In one embodiment, the modification is described as a dictionary that is used to map particular requests or request types to database command sequences. The routing action field 318 is used to select a particular database server for fulfilling the request from a set of available database servers. In one embodiment, the routing action field 318 identifies a particular database server to be used when the rule is applied by specifying a name, IP address, or other identifier associated with the particular database. In one embodiment, the routing action field 318 identifies a preference ordering of database servers.

In one embodiment, the logging action field 320 describes an action that generates a record describing the operation of the request. In one embodiment, the logging action field 320 includes a format string that specifies a data arrangement to be written to a log file. In one embodiment, the data arrangement may be based at least in part on the request or results produced by fulfilling the request. In one embodiment, the logging action field 320 includes a file name, file handle, or other identifier that identifies a log file where the record is stored. In one embodiment, information in the logging action field 320 specifies whether or not the record is to be stored in a log file. In one embodiment, the blocking action field 322 specifies whether a request is to be blocked so that no action is taken by the proxy server to fulfill the request. In one embodiment, the results action field 324 specifies an action to be taken on results that are returned as a result of fulfilling the request. In one embodiment, actions taken on results may include formatting results, modifying results, filtering results, or adding information to results. In one embodiment, the results action field 324 identifies a script, and the script takes the results as a parameter and produces modified results which are returned to the client. In one embodiment, the action specifies a script that is run when the results are returned from the database server, and the script processes the results to produce signals or metrics sent to other services.

Figure 4:
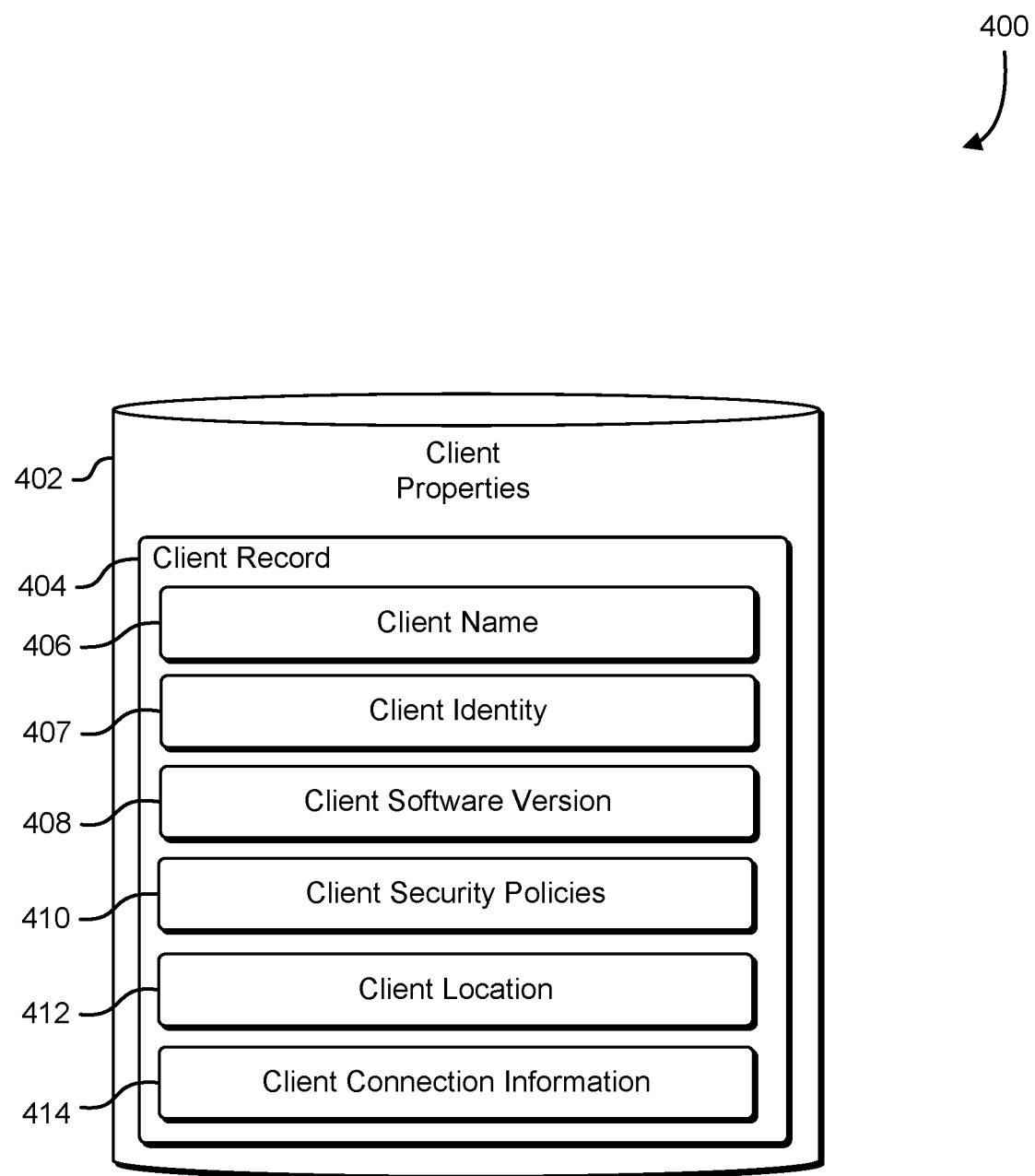
FIG. 4 shows an illustrative example of a database of client properties that is maintained by a proxy server to assist in processing rules, according to one embodiment.

FIG. 4 shows an illustrative example of a database of client properties that is maintained by a proxy server to assist in processing rules. A diagram 400 shows an embodiment of a client property database 402. In one embodiment, the client property database may be maintained as a relational database, list, tree, or hash table. In one embodiment, the client property database retains one or more client records, each of which contains information associated with a particular client computer system. In one embodiment, a client record 404 includes a client name field 406, a client identity field 407, a client software version field 408, a client security policy field 410, a client location field 412, and a client connection information field 414.

In one embodiment, the client name field 406 holds an identifier associated with a client computer system. In one embodiment, the identifier is a hostname, a client name, a machine name or a machine number. In one embodiment, the client identity field 407 holds information that is capable of verifying the identity of the client such as a digital signature, a cryptographic key, or digital certificate. In one embodiment, the client software version field 408 holds information that identifies a particular version of software running on the client computer system. In one embodiment, the information includes a browser version, a browser plug-in version, and operating system version, an operating system type, or a client software version, where the client software is software that interfaces with a proxy server. In one embodiment, the client security policy field 410 holds policy information that describes security policies that are applicable to an associated client. In one embodiment, the policy information includes information that may be used to authenticate the identity of the associated client. In one embodiment, the policy information includes information that identifies one or more database servers that the associated client is allowed to use via the proxy service. In one embodiment, the client location field 412 holds information that describes the geographic location of an associated client computer system. In one embodiment, the information is a latitude and longitude of the associated client computer system. In one embodiment, the information is a postal address of the client computer system. In one embodiment, the information is an office locator for the associated client computer system. In one embodiment, the client connection information field 414 retains information that identifies the location of an associated client computer system on a computer network. In one embodiment, the information includes one or more of an IP address, hostname, and media access control ("MAC") address of an associated client computer system.

Figure 5:
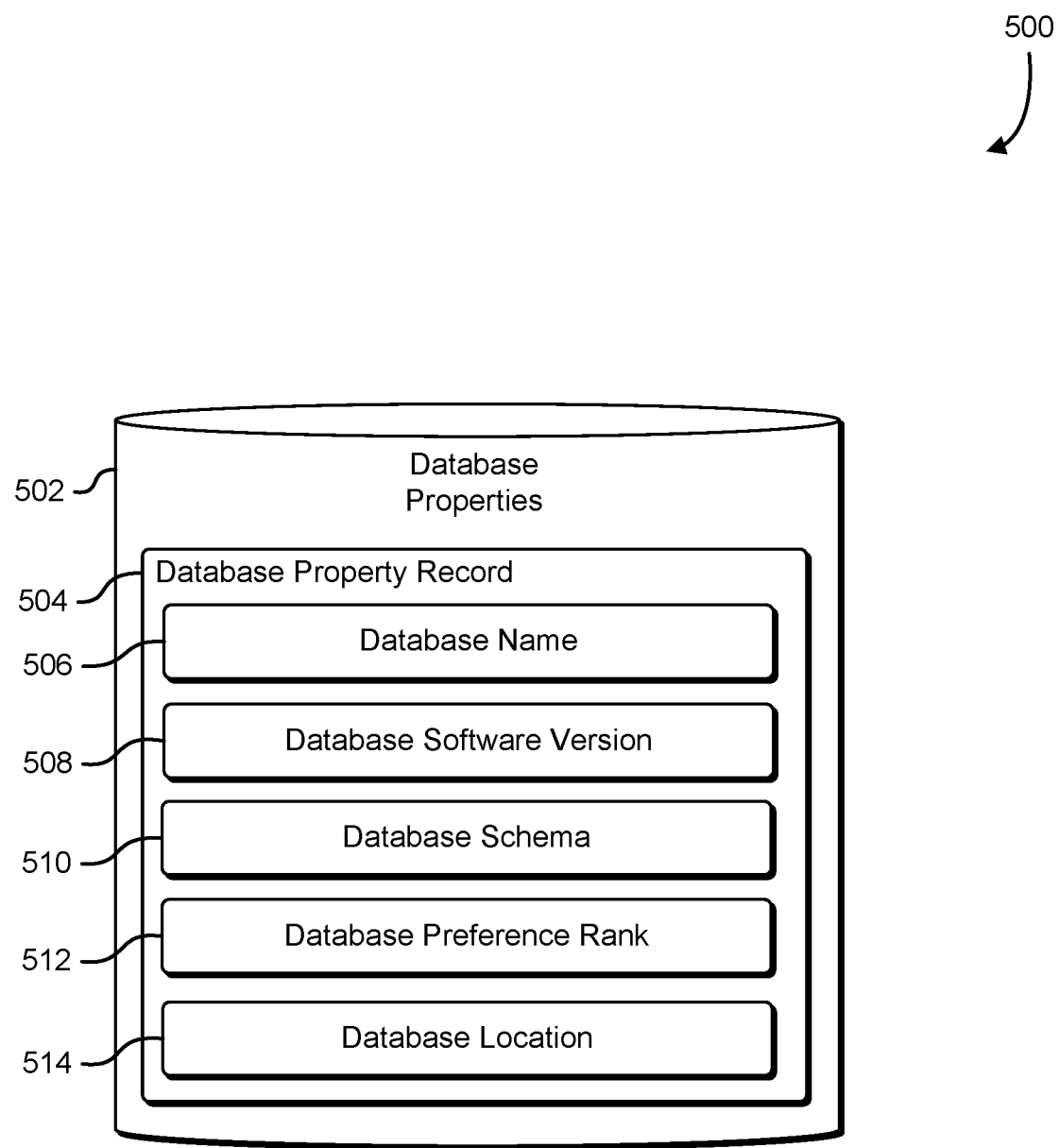
FIG. 5 shows an illustrative example of a database of database properties that is maintained by a proxy server to assist in processing rules, according to one embodiment.

FIG. 5 shows an illustrative example of a database of database properties that is maintained by a proxy server to assist in processing rules. A diagram 500 shows an embodiment of a database property database 502. In one embodiment, the database property database 502 retains information that may be used by a proxy server when selecting and using a particular proxy server for fulfilling a client request. In one embodiment, the database property database 502 retains a collection of database property records. In one embodiment, a database property record 504 includes a database name field 506, a database software version field 508, a database schema field 510, a database preference rank field 512, and a database location field 514.

In one embodiment, the database name field 506 retains a name or other identifier used to refer to a database associated with the database property record 504. In one embodiment, the database software version field 508 includes information that identifies software supporting the operation of a particular associated database. In one embodiment, the information includes one or more of a database engine type, a database engine version, and operating system type, and an operating system version. In one embodiment, the database schema field 510 retains information that describes a schema in use by a database associated with the database property record 504. In one embodiment, the information that describes a schema is represented as an XML file that identifies the tables, fields, and keys of an associated database. In one embodiment, the database preference rank field 512 holds a comparable rank value for an associated database. In one embodiment, the comparable rank is a numerical value that defines an associated database's placement in a preference order with other databases used by a proxy service. In one embodiment, the database location field 514 holds information that allows the proxy server to access a database associated with the database property record 504. In one embodiment, the database location field 514 holds an IP address and port number used to contact the particular database associated with the database property record 504. In one embodiment, the database location field 514 holds a uniform resource locator ("URL") that is usable to access an associated database. In one embodiment, the database location field 514 holds credential information that allows a proxy server to access a database associated with the database property record 504.

Figure 6:
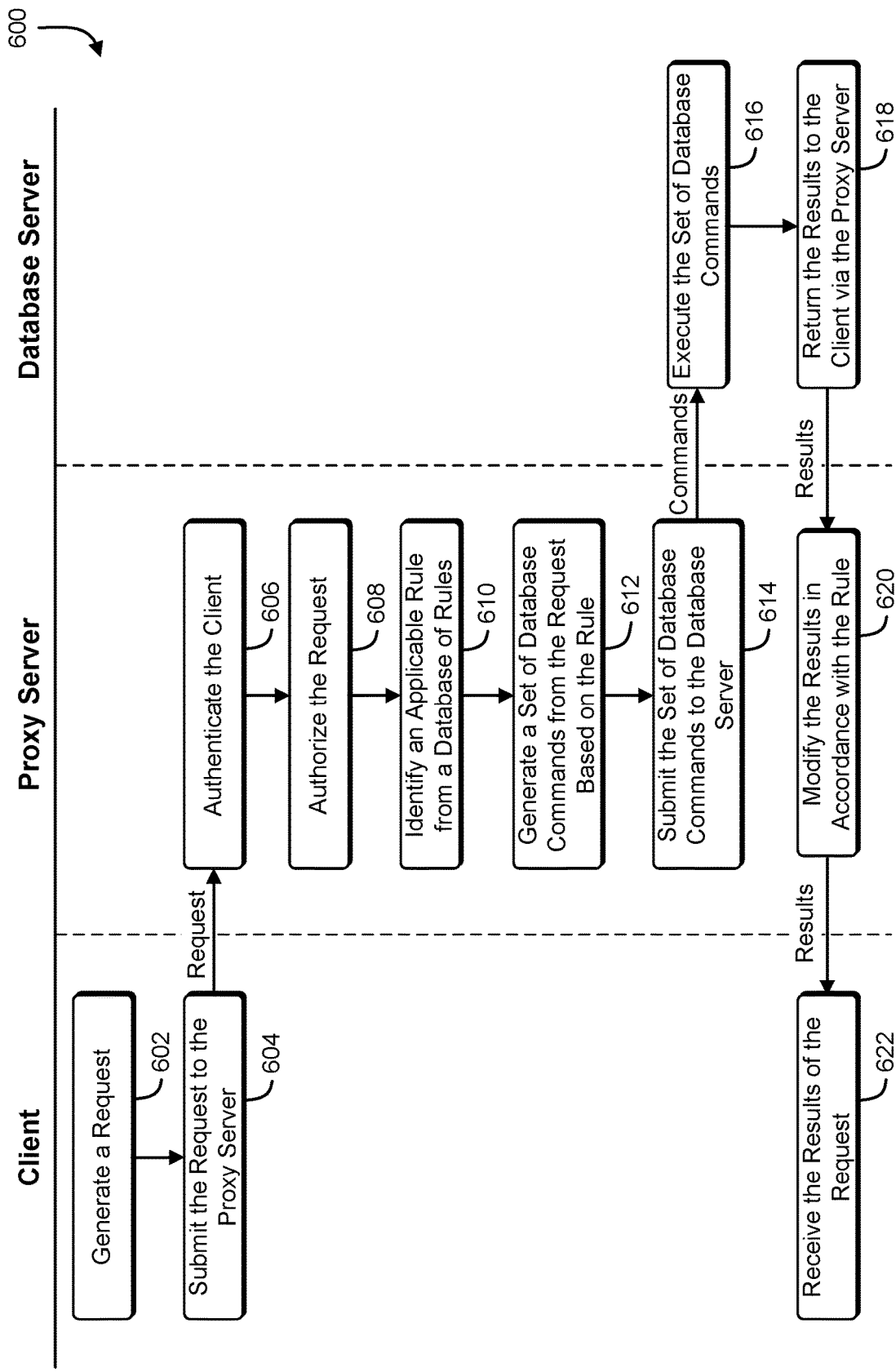
FIG. 6 shows an illustrative example of a process that, as a result of being performed by a client, a proxy server, and a database server, fulfills a request submitted by the client by submitting a corresponding set of database commands to the database server, according to one embodiment.

FIG. 6 shows an illustrative example of a process that, as a result of being performed by a client, a proxy server, and a database server, fulfills a request submitted by the client by submitting a corresponding set of database commands to the database server. In one embodiment, a swim diagram 600 illustrates an embodiment of a process that begins at block 602 with a client computer system generating a request to be submitted to the database server by the proxy server. In one embodiment, the client computer system submits 604 the request to the proxy server. In one embodiment, the client computer system submits the request to the proxy server using a web service interface provided by the proxy server. In one embodiment, the client computer system submits the request to the proxy server using a network application programming interface ("API").

The proxy server receives the request and performs a number of operations. In one embodiment, at block 606, the proxy server authenticates the client. In one embodiment, authentication is accomplished by verifying credential information received from the client with the request. In one embodiment, the credential information may include a digital signature generated using a cryptographic key associated with the client computer system. In one embodiment, the credential information may include a password issued to the client computer system. In one embodiment, at block 608, the proxy server authorizes the request. In one embodiment, the proxy server authorizes the request using a client manager. In one embodiment, the client manager queries a database of client properties which includes security policies that are applicable to each client, and based on the security policies, and determines whether the request submitted by the client computer system is allowed.

In one embodiment, at block 610, the proxy server identifies an applicable rule from a database of rules maintained by the proxy server. In one embodiment, the proxy server searches a rules database, and evaluates applicability logic for each rule in the rules database to determine whether each rule in the rules database is applicable to the request. In one embodiment, the proxy server identifies a set of rules that are applicable to the request. In one embodiment, at block 612, the proxy server applies the set of rules to generate a set of database commands that, when executed on a particular database server, fulfill the request. In one embodiment, if the set of rules is empty, the proxy server generates a set of database commands that matches the request. In one embodiment, based at least in part on the applicable rules, the set of database commands may be a modified version of the request, a matching version of the request, or an empty set of database commands. In one embodiment, at block 614, the proxy server submits the set of database commands to the database server. In one embodiment, the set of database commands may be submitted to the database server over a logical connection maintained by the proxy server with the database server. In one embodiment, the set of database commands is submitted to the database server using a remote procedure call ("RPC").

At block 616, the database server receives the set of database commands and the proxy server. In one embodiment, at block 616, the database server executes the set of database commands received from the proxy server. In one embodiment, execution of the database commands is performed on a database engine running on the database server. In one embodiment, the set of database commands is comprised of SQL commands. In one embodiment, the set of database commands includes a stored procedure. In one embodiment, as a result of executing the set of database commands, the database server produces a set of results. In one embodiment, at block 618, the database server returns the set of results to the proxy server. In one embodiment, the database server returns the results to the proxy server over the return channel used to submit the set of commands to the database server.

At block 620, the proxy server receives a set of results from the database server. In one embodiment, at block 620, the proxy server processes the set of results in accordance with the set of applicable rules identified at block 610. In one embodiment, the set of applicable rules causes the proxy server to modify the set of results. In one embodiment, the set of applicable rules causes the proxy server to change the format of the set of results. In one embodiment, after applying the set of applicable rules to the set of results, the proxy server forwards the modified results to the client computer system. In one embodiment, at block 622, the client computer system receives the modified results from the proxy server.

Figure 7:
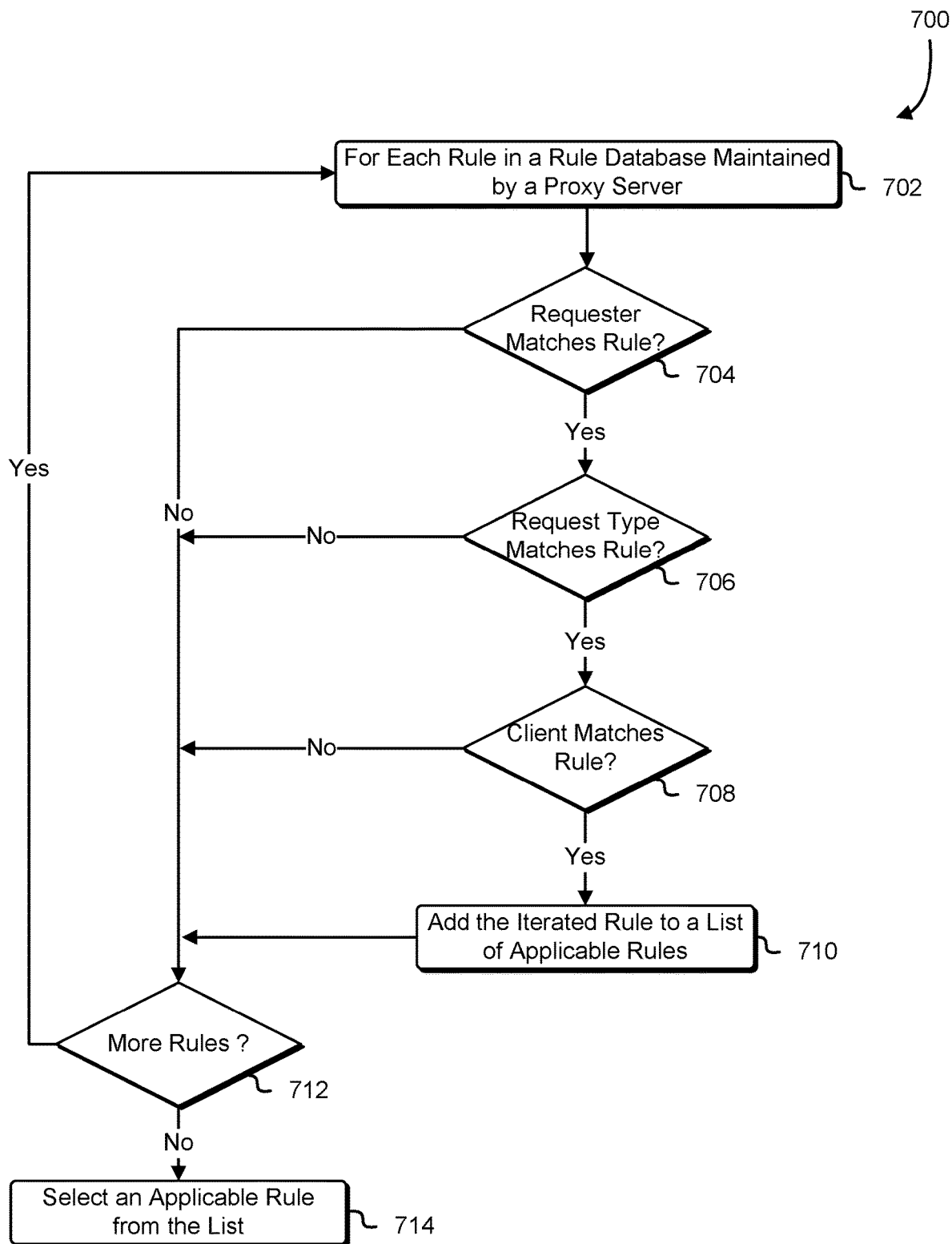
FIG. 7 shows an illustrative example of a process that, as a result of being performed by a proxy server, selects a rule from a rules database to apply to a request submitted by a client, according to one embodiment.

FIG. 7 shows an illustrative example of a process that, as a result of being performed by a proxy server, selects a rule from a rules database to apply to a request submitted by a client. A flowchart 700 illustrates one embodiment of a process that begins at block 702 with a proxy server initiating a loop over each rule in a rules database maintained by the proxy server. In one embodiment, each rule includes a set of applicability logic. In one embodiment, the applicability logic includes request-type-based applicability logic, requester-based applicability logic, and client-based applicability logic.

At decision block 704, the proxy server determines whether the request satisfies the requester-based applicability logic of the currently iterated rule. In one embodiment, the requester is identified based at least in part on credentials provided with the request, and the requester-based applicability logic specifies a set of users, a user group, or a security role to which the rule is applicable. If the proxy server determines that the request satisfies the requester-based applicability logic for the currently iterated rule, execution advances to decision block 706.

At decision block 706, the proxy server determines whether the request satisfies the request-type-based applicability logic of the currently iterated rule. In one embodiment, the request type may be a pass-through type, a database-query type, a database-schema-change type, a database-data-add types, or a database-data-delete type, and the request-type-based applicability logic identifies one or more request type to which the iterated request is applicable. If the proxy server determines that the request satisfies the request-type-based applicability logic for the currently iterated rule, execution advances to decision block 708.

At decision block 708, the proxy server determines whether the request satisfies the client-based applicability logic of the currently iterated rule. In one embodiment, the client is identified based at least in part on a network address, a network name, or digital signature associated with the requester, and the client-based applicability logic specifies a network address, range of network addresses, domain name, subnet, or collection of network names to which the rule is applicable. If the proxy server determines that the request satisfies the client-based applicability logic for the currently iterated rule, execution advances to block 710.

At block 710, the proxy server adds the iterated rule to a collection of applicable rules. In one embodiment, the proxy server adds the iterated rule to a linked list of applicable rules. In one embodiment, the proxy server adds the iterated rule to a queue of applicable rules for later processing. After adding the iterated rule to the collection of applicable rules, execution advances to decision block 712. If the proxy server determines that the request does not satisfy the request-type-based applicability logic, the requester-based applicability logic, or the client-based applicability logic, execution advances to decision block 712.

At decision block 712, the proxy server determines whether there are more rules in the rules database to be processed. If there are more rules to be processed, execution returns to block 702 and the next rule in the rules database is evaluated to determine if the rule is applicable to the request. If there are not more rules to be processed, execution advances to block 714. In one embodiment, at block 714 the proxy server selects a particular rule from the set of applicable rules for application to the request. The particular rule may be selected from the set of applicable rules based on a preference ordering or priority defined by the rules themselves, by an administrator, or by the user. In one application, at block 714, the proxy server passes the set of applicable rules to the database proxy service which applies each rule in the set of applicable rules to the request.

Figure 8:
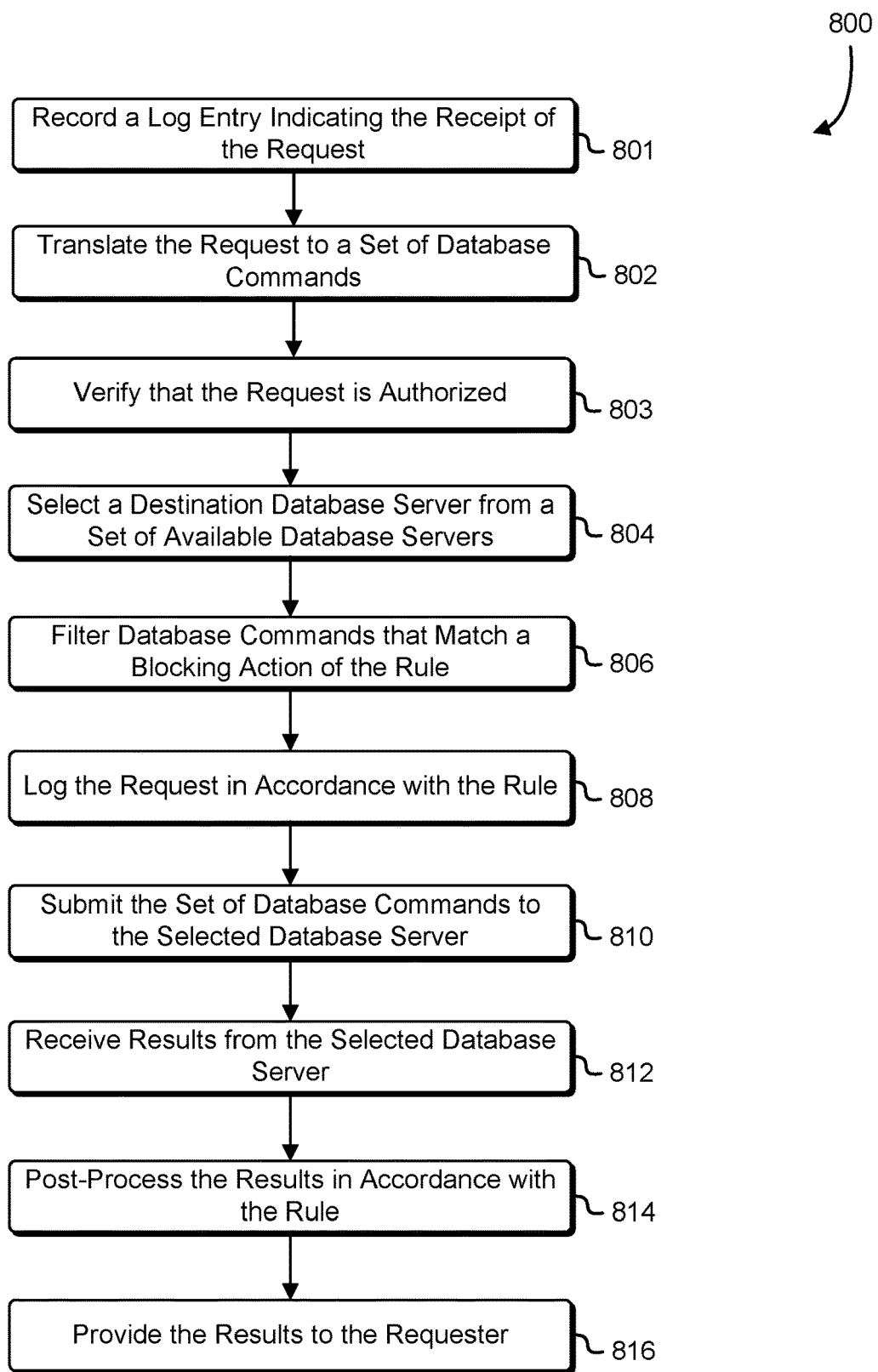
FIG. 8 shows an illustrative example of a process that, as a result of being performed by a proxy server, fulfills a request by applying a selected rule to the request to produce a set of database commands which are submitted to a database server, according to one embodiment.

FIG. 8 shows an illustrative example of a process that, as a result of being performed by a proxy server, fulfills a request by applying a selected rule to the request to produce a set of database commands which are submitted to a database server. A flowchart 800 illustrates an embodiment of a process that begins at block 801 with a proxy server storing a log entry that records the receipt of the request at the proxy server. At block 802 with the proxy server translates the request received from the client computer system into a corresponding set of database commands. The set of database commands is generated so that execution of the set of database commands on a database server fulfills the request. In one embodiment, a plurality of database servers are available to the proxy server for fulfilling requests. In an embodiment, at block 803, the proxy server verifies that the request is authorized by the client computer system. In an embodiment, if the request is not authorized, the proxy server indicates, to the client computer system, that the request is rejected. In an embodiment, if the request is authorized, execution advances to block 804. At block 804, the proxy server selects a destination database server from a set of available database servers. In one embodiment, the destination database server is selected based at least in part on the selected rule that is applicable to the request. In one embodiment, the destination database server is selected based at least in part on preferences configured by an administrator. In one embodiment, the destination database server is selected based at least in part on a performance measure of each available database server.

The proxy server may apply a series of actions from the selected rule. In one embodiment, at block 806, the proxy server applies a blocking action to the request in accordance with the selected rule. In one embodiment, the blocking action presents the request from being fulfilled. In one embodiment, the blocking action filters one or more commands from the set of database commands generated at block 802. In one embodiment, at block 808, the proxy server applies a logging action to the request in accordance with the selected rule. In one embodiment, a logging action identifies a destination log file to which logging information is to be written. In one embodiment, the logging action includes a format string that describes how information is to be stored in the destination log file.

At block 810, the proxy server submits the set of database commands to the selected database server. In one embodiment, the proxy server submits the set of database commands to the selected database server over a logical connection established between the proxy server and the database server. In one embodiment, the logical connection is selected from a pool of active logical connections between the proxy server in the database server. In one embodiment, if a logical connection is not available, the proxy server establishes a logical connection to the database server for submitting the set of database commands.

In one embodiment, the selected database server generates results in response to the set of database commands, and the results are received 812 by the proxy server. In one embodiment, at block 814, the proxy server processes the received results in accordance with a result-based action defined by the selected rule. In one embodiment, the proxy server alters the format of the results to a form desired by the requester. In one embodiment, the proxy server filters the results. At block 816, the proxy server returns the results to the requester.

Figure 9:
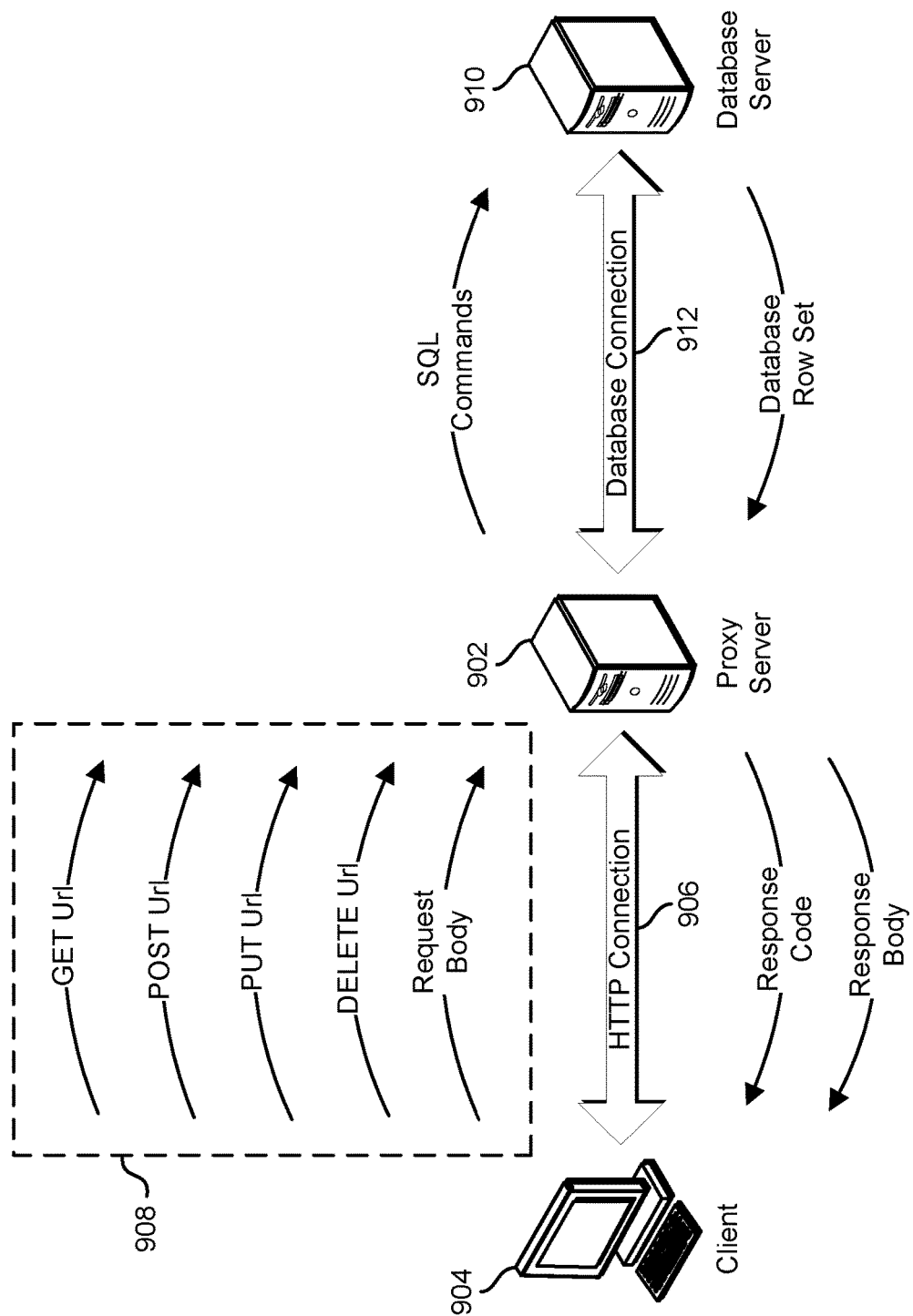
FIG. 9 shows an illustrative example of a proxy server that provides a representational state transfer ("REST") interface to a relational database server, according to one embodiment.

FIG. 9 shows an illustrative example of a proxy server that provides a representational state transfer ("REST") interface to a relational database server. A system diagram 900 illustrates an embodiment of a proxy server 902 that implements a REST interface. In one embodiment, the REST interface is implemented as a web interface that is accessible over a computer network. In one embodiment, the REST interface is implemented using the hypertext transport protocol ("HTTP"). In one embodiment, the REST interface is made available to a client computer system 904. The client computer system may be a personal computer, laptop computer, tablet computer, mobile device, cell phone, network appliance, or other network-connected device.

In one embodiment, the client computer system 904 sends a web request to the proxy server 902 via an HTTP connection 906, and the web request specifies a request method from a set of supported HTTP request methods 908. In one embodiment, the set of supported HTTP request methods 908 includes a GET method, a POST method, PUT method, or a DELETE method, and each request may include a request body. In one embodiment, the proxy server 902 receives the web request from the client computer system 904 and generates a set of SQL commands that, when executed by a database server 910, fulfill the request.

In one embodiment, the proxy server 902 sends the set of SQL commands to the database server 910 via a logical connection 912. In one embodiment, the logical connection 912 is a TCP connection established between the proxy server 902 and the database server 910. In one embodiment, the logical connection 912 is established using a database-specific protocol over a computer network. In one embodiment, the database server 910 executes the set of SQL commands and produces a set of results. In one embodiment, the set of results is a database rowset. In one embodiment, the database server 910 returns the results to the proxy server 902 via the logical connection 912.

In one embodiment, the proxy server 902 receives the results from the database server 910, and produces a REST compatible result set to be returned to the client computer system 904. In one embodiment, the proxy server 902 applies one or more rules to the result set to transform, modify, or filter the results provided to the client computer system 904. In one embodiment, the results received from the database server 910 are used to produce a response code and a response body. In one embodiment, the response code is a web request response code in accordance with the HTTP standard. In one embodiment, the response body is an HTTP response body. In one embodiment, the proxy server 902 provides a web response that includes the response code and the response body to the client computer system 904 via the HTTP connection 906.

Figure 10:
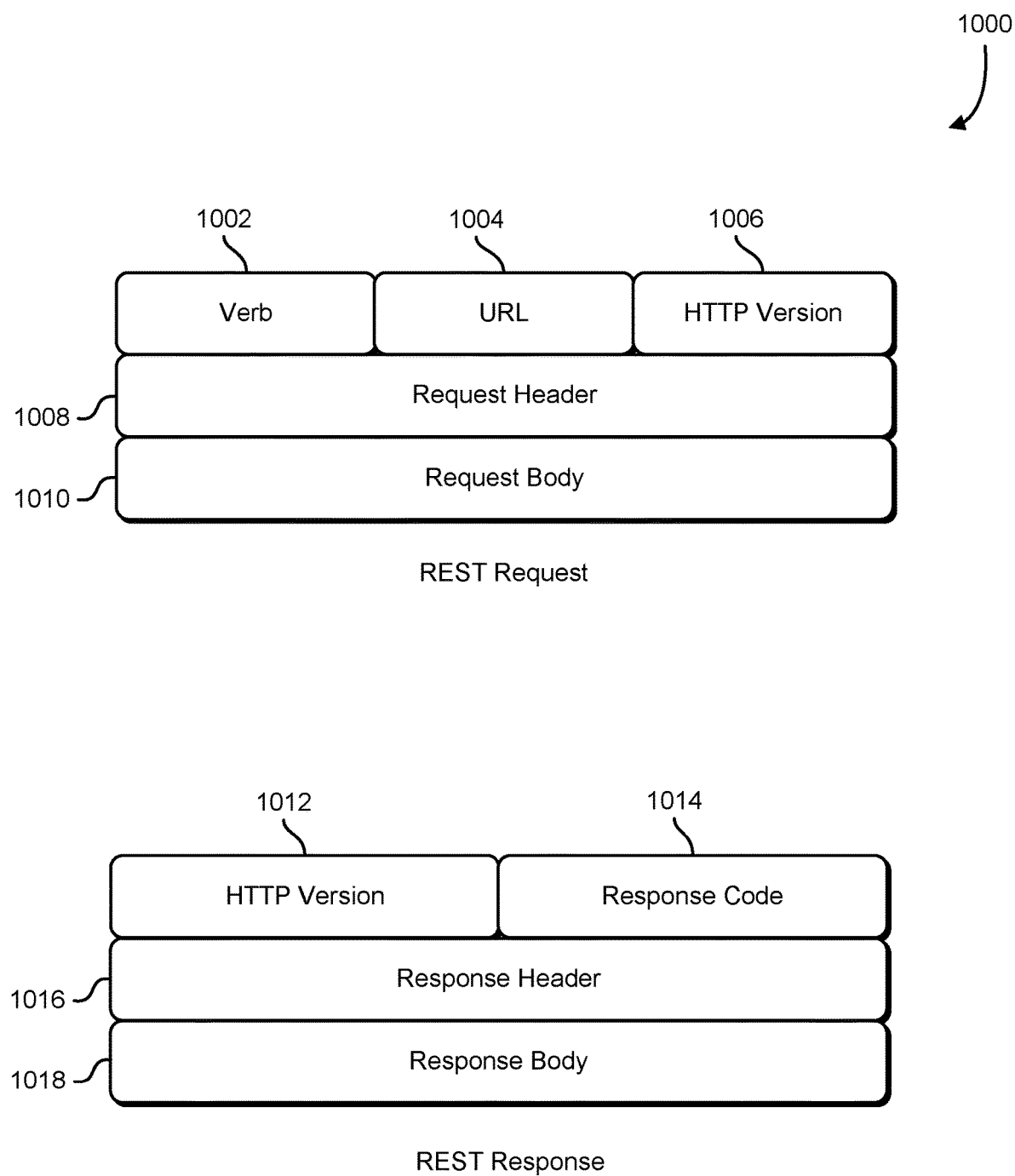
FIG. 10 shows an illustrative example of a REST request and a REST response, according to one embodiment.

FIG. 10 shows an illustrative example of a REST request and a REST response. A diagram 1000 illustrates an embodiment of a REST interface implemented using HTTP. In one embodiment, the REST request includes a verb field 1002, the URL field 1004, an HTTP version field 1006, a request header 1008, and a request body 1010. In one embodiment, the verb field 1002 specifies an HTTP method such as get, post, or delete. In one embodiment, the URL field 1004 holds text representation of the uniform resource locator that identifies the REST interface. In one embodiment, the HTTP version field specifies the version of the HTTP standard with which the request is compliant. In one embodiment, the request header 1008 includes information associated with one or more field names specified by the Internet engineering task force ("IETF") in RFCs 7230, 7231, 7232, 7233, 7234, and a 7235. In one embodiment, the request header 1008 identifies content types that are acceptable for the response. In one embodiment, the request header 1008 includes authentication credentials for the request. In one embodiment, the request header 1008 identifies properties of an HTTP connection used to transmit the request. In one embodiment the request body 1010 includes parameters of the request, and the verb field 1002 identifies the request as a POST request. In one embodiment, the request body 1010 is omitted or empty.

In one embodiment, the REST response includes an HTTP version field 1012, an HTTP response code 1014, a response header 1016, and a response body 1018. In one embodiment, the HTTP version field identifies an HTTP protocol standard to which the response conforms. In one embodiment, the HTTP response code identifies a status code associated with the response. HTTP response codes (V1.1) are described in RFC 2616. In one embodiment, the response header includes information associated with one or more field names specified in RFC 7230, 7231, 7232, 7233, 7234, and 7235. In one embodiment, the response header 1016 specifies connection information, content types, character encodings, or other properties of the REST response. In one embodiment, the response body 1018 contains response content generated by the proxy server. In one embodiment, the response content is generated based at least in part on results returned to the proxy server from a database server. In one embodiment, the response body 1018 is in JavaScript Object Notation ("JSON") format. In one embodiment, the response body 1018 is in hypertext markup language ("HTML") format. In one embodiment, the response body 1018 is in text format.

Figure 11:
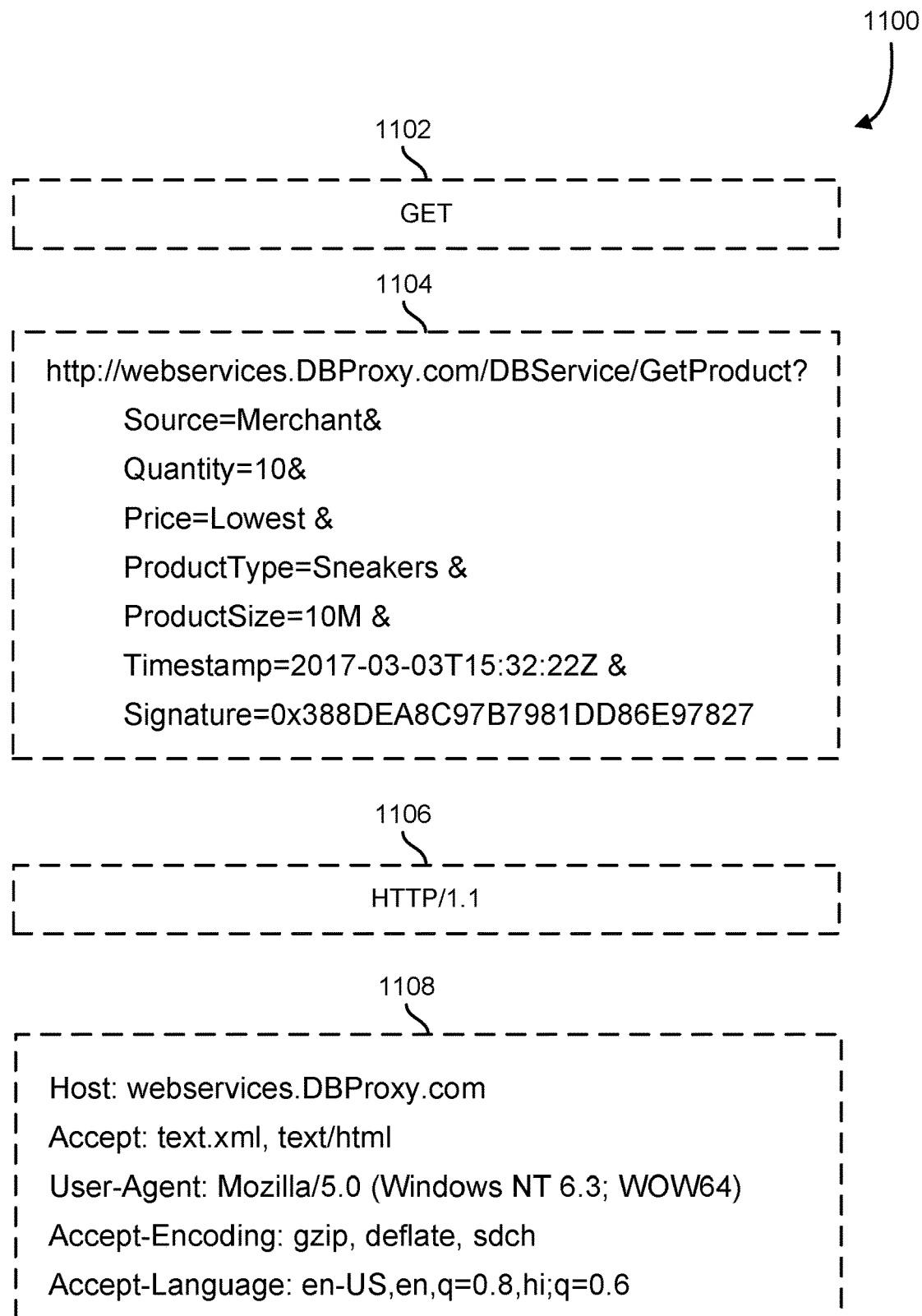
FIG. 11 shows an illustrative example of a REST request received from a client computer system via a Web interface, according to one embodiment.

FIG. 11 shows an illustrative example of a REST request received from a client computer system via a Web interface. A diagram 1100 illustrates an embodiment of a REST request using the GET method. In one embodiment, the REST request includes a verb 1102, a request header 1104, an HTTP version 1106, and a header 1108. In one embodiment, the verb 1102 specifies that the REST request uses the HTTP GET method. In one embodiment, the HTTP GET method uses a URL to pass parameters of the REST request. In one embodiment, the request header 1104 includes a URL. In one embodiment, the URL includes a first portion used to locate the REST interface, a second portion that identifies a particular function, and a third portion that includes one or more parameters that are passed to the REST request. In the embodiment illustrated in FIG. 11, the first portion of the URL is 'http://webservices.DBProxy.com,' the second portion of the URL is '/DBService/GetProduct?,' and the third portion of the URL is 'Source=Merchant& Quantity=10& Price=Lowest & ProductType=Sneakers &

ProductSize=10M & Timestamp=2017-03-03T15:32:22Z & Signature=0x388DEA8C97B7981DD86E97827.'

In one embodiment, the HTTP version 1106 identifies a version of the HTTP protocol with which the REST request is compliant. In the embodiment shown in FIG. 11, the HTTP protocol version is HTTP 1.1. In one embodiment, the header 1108 includes a set of header content fields defined in the HTTP protocol. In the embodiment shown in FIG. 11, the header 1108 identifies a host, a user agent, and various properties of an expected response. In one embodiment, the various properties include a set of format options, a set of text encoding options, and a language.

Figure 12:
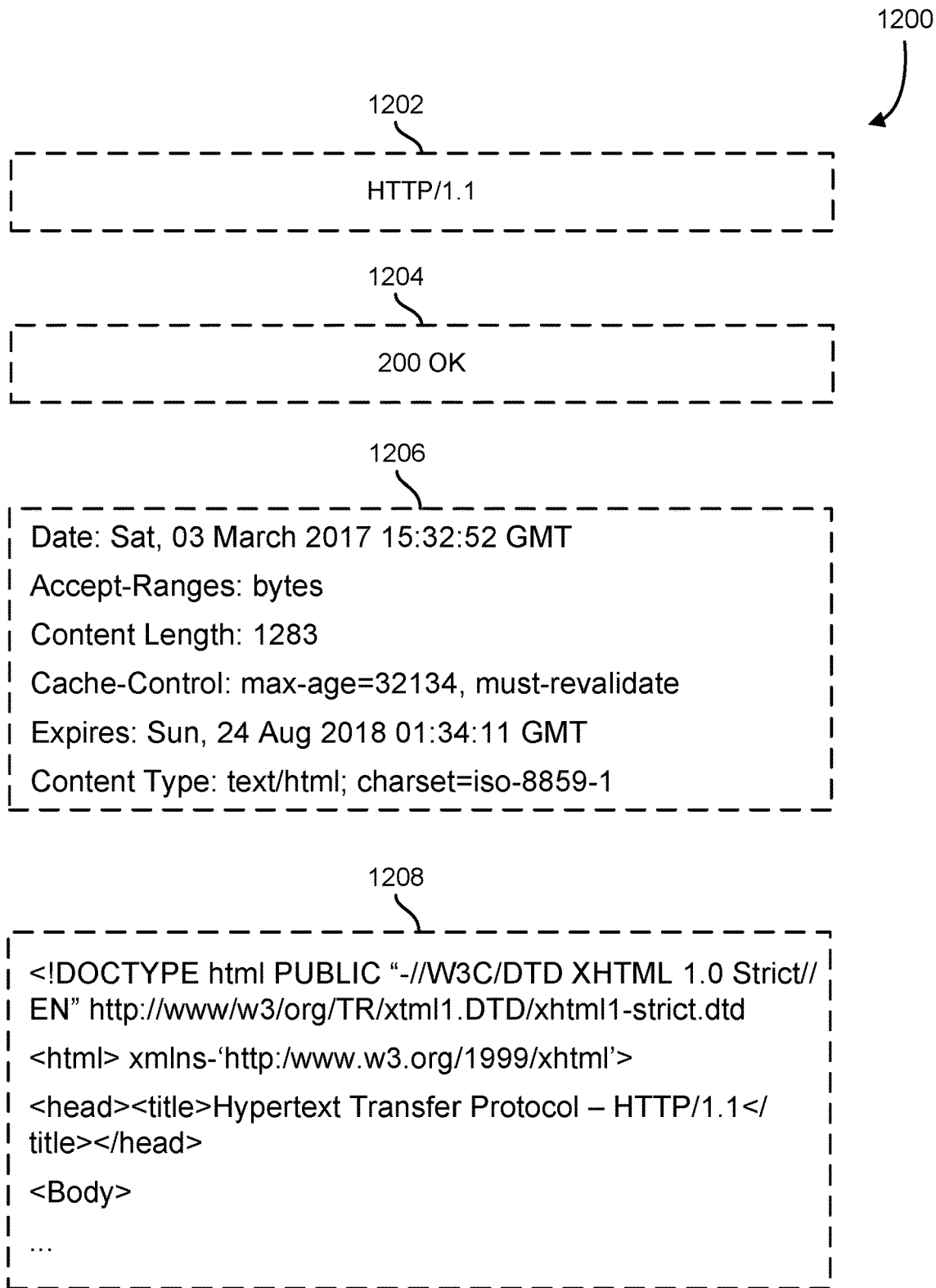
FIG. 12 shows an illustrative example of a response to a REST request, according to one embodiment.

FIG. 12 shows an illustrative example of a response to a REST request. A diagram 1200 illustrates an embodiment of a REST response. The REST response includes an HTTP version 1202, a response code 1204, a header 1206, and a body 1208. In one embodiment, the HTTP version 1202 specifies a version of the HTTP protocol with which the response complies. In one embodiment, the response code 1204 includes an HTTP response number and an associated description of the response code. In one embodiment, the header 1206 describes various properties of the response. In one embodiment, the header 1206 describes the length of the body of the response. In one embodiment, the header 1206 describes the encoding of the response. In one embodiment, the header 1206 includes an expiration time for the response. In one embodiment, the header 1206 includes a time at which the response was produced.

The body 1208 contains information provided by the proxy server in response to the REST request. In one embodiment, the information is generated based at least in part on results received from a database server. In one embodiment, the body includes information that is encoded as an HTML document. In one embodiment, the body includes information that is encoded as an XML document. In one embodiment, the body includes information that is encoded in JSON format. In one embodiment, the body matches the information provided to the proxy server by the database server in response to the request.

Figure 13:
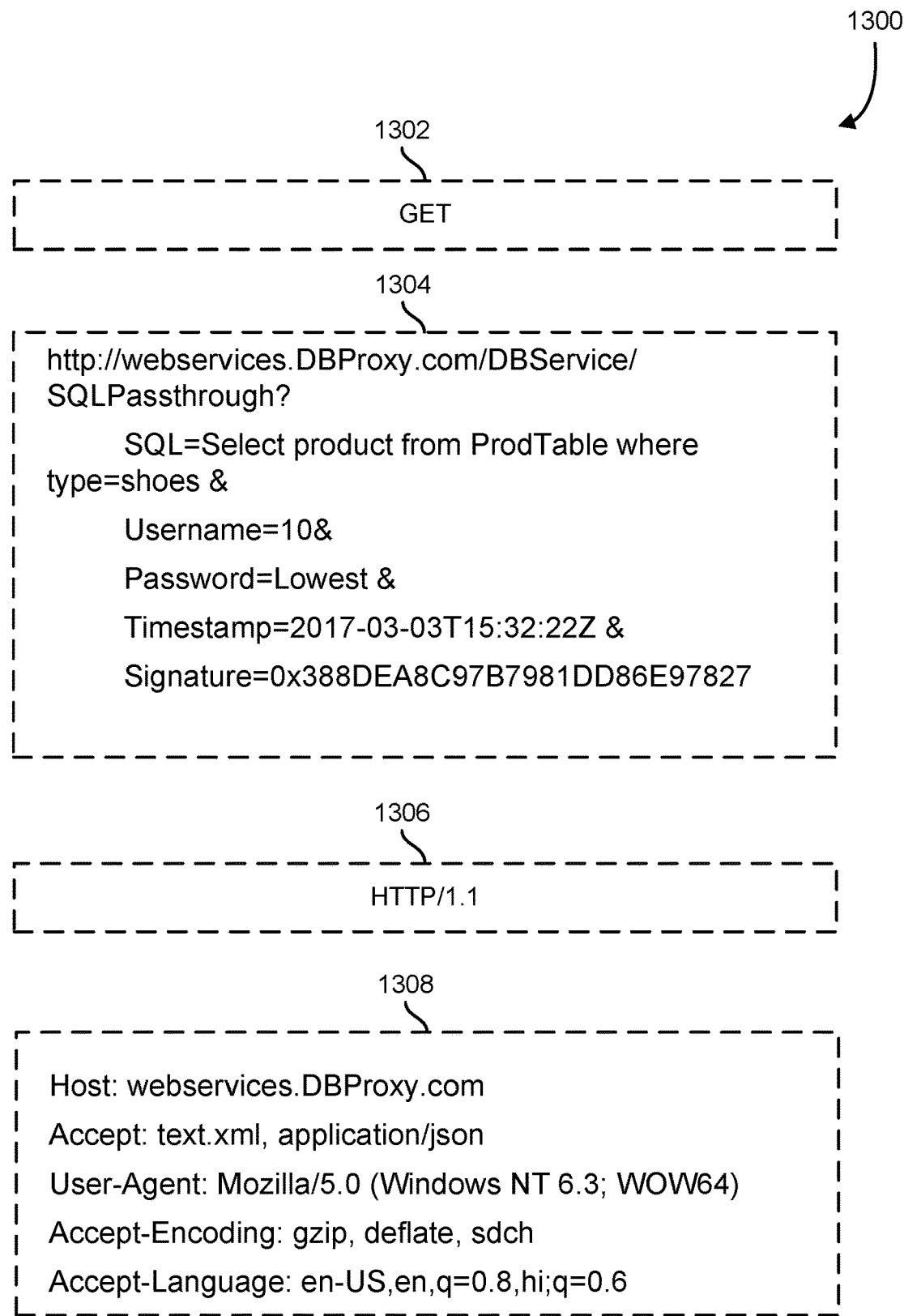
FIG. 13 shows an illustrative example of a REST interface implementation that provides a structured query language ("SQL") pass-through to a relational database server, according to one embodiment.

FIG. 13 shows an illustrative example of a REST interface implementation that provides a structured query language ("SQL") pass-through to a relational database server. A diagram 1300 illustrates an embodiment of an SQL pass-through request submitted by a client computer system to a proxy server. In one embodiment, the SQL pass-through request includes a verb 1302, a URL 1304, the version 1306, and a header 1308. In one embodiment, the verb 1302 is an HTTP GET. In one embodiment, the URL 1304 includes a host portion, a function portion, and a parameter portion. In one embodiment, the host portion identifies a protocol and domain name of the server hosting the REST interface such as 'http://webservices.DBProxy.com.' In one embodiment, the server hosting the REST interface is the proxy server. In one embodiment, the function portion identifies that the request is an SQL pass-through request. In the embodiment shown in FIG. 13, the function portion is '/DBService/SQLPassthrough.' In one embodiment, the version 1306 identifies a version of the HTTP protocol with which the request is compliant.

In one embodiment, the header 1308 includes a set of header content fields defined in the HTTP protocol. In the embodiment shown in FIG. 13, the header 1308 identifies a host 'webservices.DBProxy.com,' a user agent 'Mozilla/5.0 (Windows NT 6.3; WOW64),' and various properties of an expected response. In one embodiment, the various properties include a set of format options 'Accept: text.xml, application/json,' a set of text encoding options 'Accept-Encoding: gzip, deflate, sdch,' and a language 'Accept-Language: en-US,en,q=0.8,hi;q=0.6.'

Figure 14:
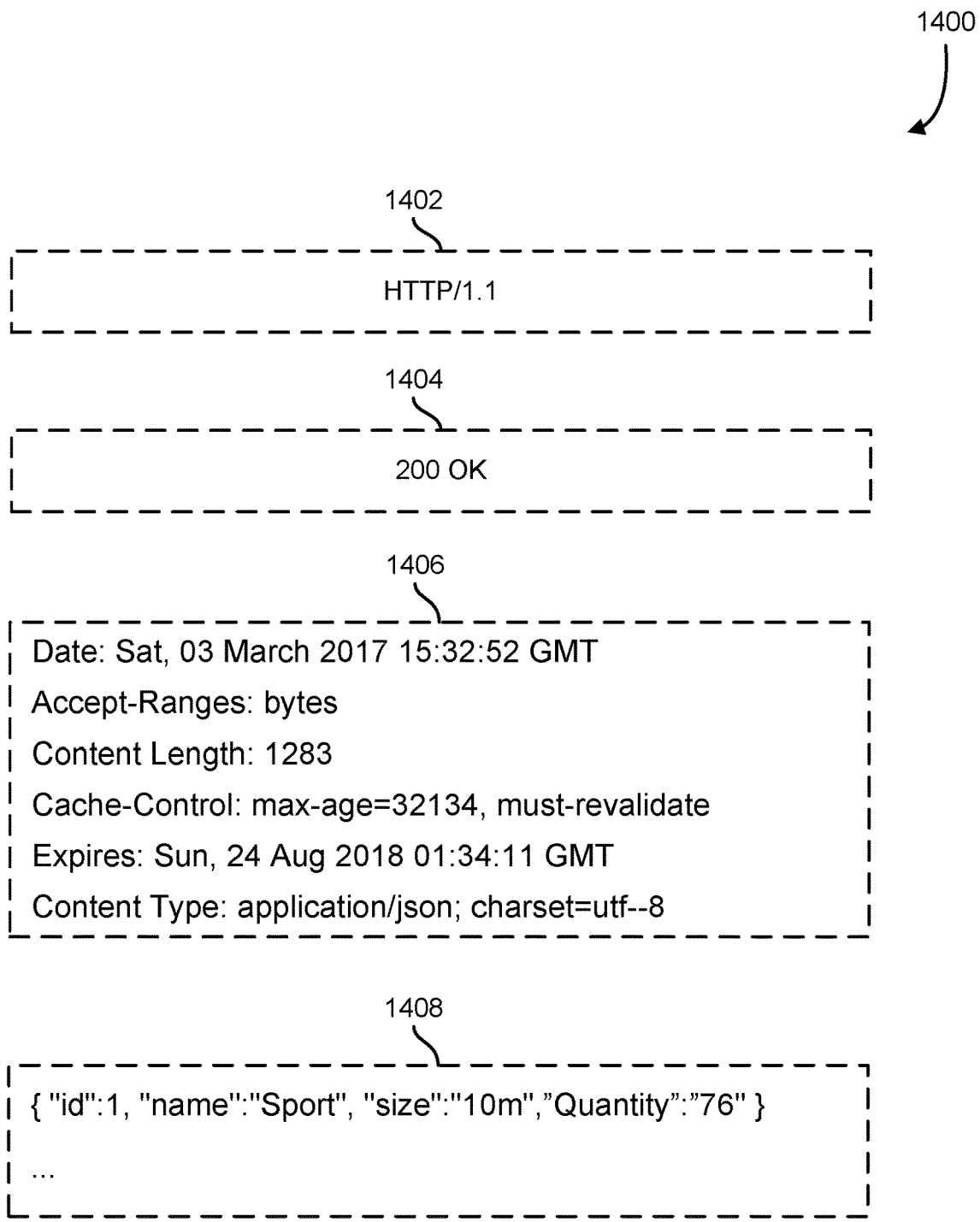
FIG. 14 shows an illustrative example of a JavaScript Object Notation ("JSON") response to a REST request, according to one embodiment.

FIG. 14 shows an illustrative example of a JavaScript Object Notation ("JSON") response to a REST request. A diagram 1400 illustrates an embodiment of a REST response in JSON format. The REST response includes an HTTP version 1402, a response code 1404, a header 1406, and a body 1408. In one embodiment, the HTTP version 1402 specifies a version of the HTTP protocol with which the response complies. In one embodiment, the response code 1404 includes an HTTP response number and an associated description of the response code. In one embodiment, the header 1406 describes various properties of the response. In one embodiment, the header 1406 describes the length of the body of the response. In one embodiment, the header 1406 specifies that the body 1408 is encoded in a JSON format 'Content Type: application/json; charset=utf-8.' In one embodiment, the header 1406 includes an expiration time for the response. In one embodiment, the header 1406 includes a time at which the response was produced.

The body 1408 contains a representation of information provided by the proxy server in response to the REST request. In one embodiment, the information is generated by converting results received from a database server into a JSON format. In one embodiment, the proxy server receives a rowset result from a database server, converts the rowset result into a JSON format, and stores the converted rowset in the body 1408.

Figure 15:
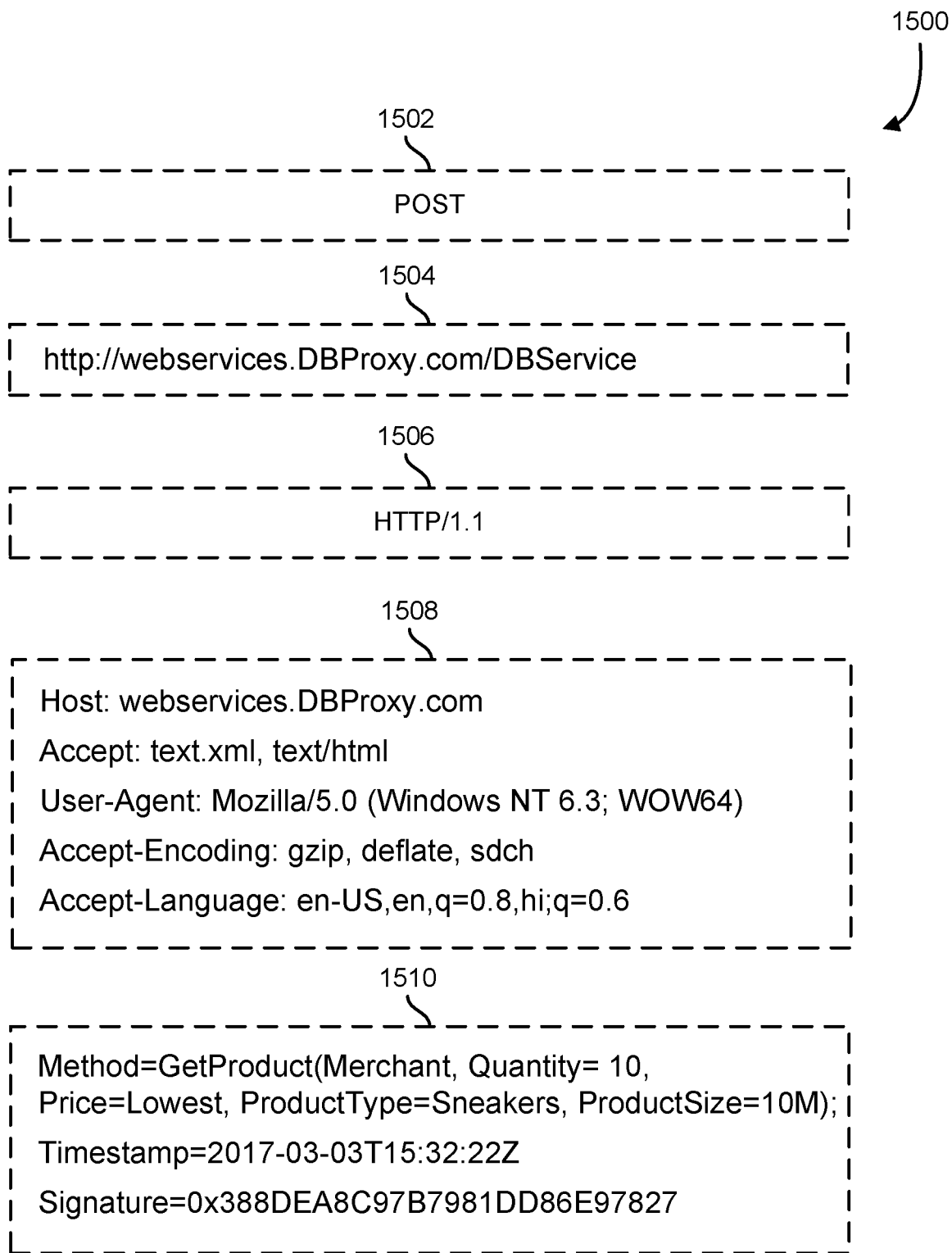
FIG. 15 shows an illustrative example of a REST interface implementation that passes one or more parameters in the body of a web request, according to one embodiment.

FIG. 15 shows an illustrative example of a REST interface implementation that passes one or more parameters in the body of a web request. A diagram 1500 illustrates an embodiment of a REST request using the POST method. In one embodiment, the REST request includes a verb 1502, a request header 1504, an HTTP version 1506, a header 1508, and a body 1510. In one embodiment, the verb 1502 specifies that the REST request uses the HTTP POST method. In one embodiment, the HTTP GET method uses the body 1510 to pass parameters associated with the REST request. In one embodiment, the request header 1504 includes a URL. In one embodiment, the URL includes a first portion to identify protocol, a second portion used to locate the REST interface, and a third portion that identifies a particular REST object. In the embodiment illustrated in FIG. 15, the first portion of the request header is 'http://,' second portion of the URL is 'webservices.DBProxy.com,' and the third portion of the web request URL is "/DBService."

In one embodiment, the HTTP version 1506 identifies a version of the HTTP protocol with which the REST request is compliant. In the embodiment shown in FIG. 15, the HTTP protocol version is HTTP 1.1. In one embodiment, the header 1108 includes a set of header content fields defined in the HTTP protocol. In the embodiment shown in FIG. 15, the header 1508 identifies a host, a user agent, and various properties of an expected response. In one embodiment, the various properties include a set of format options, a set of text encoding options, and a language. In one embodiment, the body 1510 includes a number of parameters that are passed to the proxy server with the request. The parameters may be provided in a variety of formats. In one embodiment, the parameters are provided in XML format. In one embodiment, the parameters are provided in JSON format. In one embodiment, the parameters are provided as key-value pairs. In one embodiment, the body 1510 includes a timestamp and a digital signature where the timestamp identifies when the request was generated, and the digital signature is a credential that the proxy server uses to authorize the request.

Figure 16:
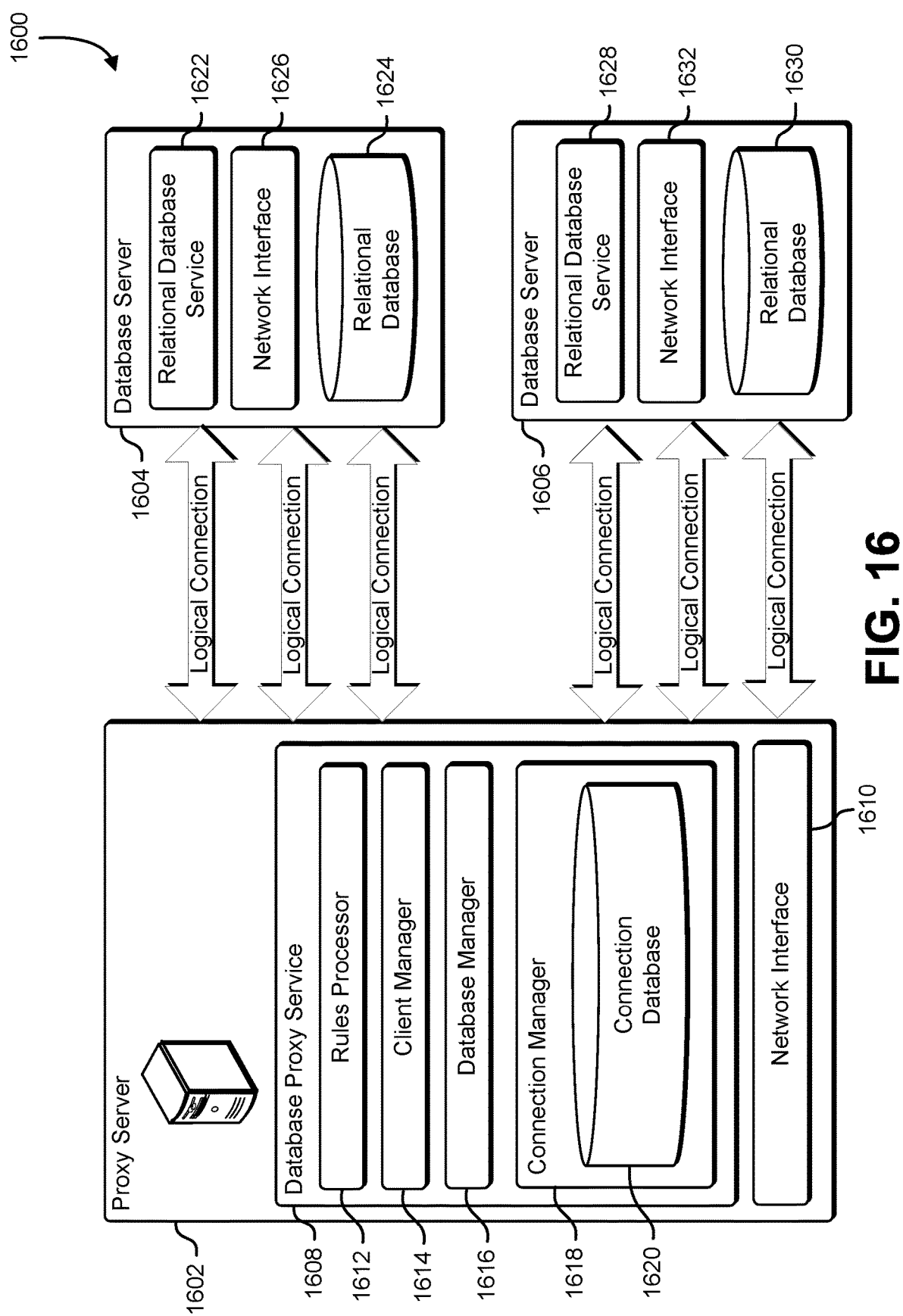
FIG. 16 shows an illustrative example of a proxy server that manages a number of logical connections to a plurality of database servers, according to one embodiment.

FIG. 16 shows an illustrative example of a proxy server that manages a number of logical connections to a plurality of database servers. A block diagram 1600 illustrates an embodiment of a proxy server 1602 that manages a set of logical connections to a first database server 1604 and a second database server 1606. In one embodiment, the proxy server 1602, the first database server 1604, and the second database server 1606 are interconnected via a computer network such as an Ethernet network, a token ring network, or a fiber Channel network. In one embodiment, the proxy server establishes one or more persistent logical network connections with the first database server 1604 and the second database server 1606. The persistent logical network connections may be maintained between subsequent requests. In one embodiment, when the proxy server 1602 receives a request from a client computer system, the proxy server 1602 generates a set of database commands, selects a particular logical connection from currently established logical connections, and sends the set of database commands to a database server via a selected logical connection. In one embodiment, after results are received by the selected logical connection, the selected logical connection is maintained for later use by the proxy server 1602.

The proxy server 1602 hosts a database proxy service 1608 and includes a network interface 1610. In one embodiment, the network interface 1610 serves as an endpoint for one or more logical connections to one or more available database servers. In one embodiment, the network interface 1610 is an Ethernet network interface. In one embodiment, the network interface 1610 is a wireless network interface.

The database proxy service 1608 includes a rules processor 1612, a client manager 1614, a database manager 1616, and a connection manager 1618. In one embodiment, the rules processor 1612 is a service that maintains a database of rules used to configure the operation of the proxy server 1602. In one embodiment, the rules processor determines a set of applicable rules for each request received by the proxy server 1602, and applies the set of applicable rules to produce a set of database commands that are usable to fulfill the request. In one embodiment, the client manager 1614 is a service that maintains information related to client computer systems that access the proxy server 1602. In one embodiment, the client manager 1614 includes authentication information that allows the proxy server 1602 to authenticate the identity of each requester. In one embodiment, the client manager 1614 includes security policy information associated with each client computer system, and the security policy information is used to authorize the request sent by a particular client computer system.

The database manager 1616 is a service that retains and manages information that describes database servers that are accessible to the proxy server 1602. In one embodiment, the database manager 1616 maintains information that describes the capabilities, properties, and characteristics of the first database server 1604 and the second database server 1606. In one embodiment, for a particular database, the information may include a database engine type and version, a network address, a schema, a measure of processing speed, a measure of server load, a measure of cost, and a measure of available storage space. In one embodiment, cost measures may include a cost per database operation of the particular database, or an amortized cost per day for the particular database.

The connection manager 1618 is a service that maintains a record of active connections, and assists in the selection of a particular connection to be used by the proxy server 1602 when fulfilling a request. In one embodiment, the connection manager maintains a connection database 1620. In one embodiment, the connection database retains information associated with each active logical connection between the proxy server 1602 and an available database server. In one embodiment, the connection database 1620 maintains a connection identifier, a connection address, a connection history, and a reference to database information maintained by the database manager 1616. In one embodiment, when a request is received from the client computer system, the connection manager 1618 uses the information maintained by the database proxy service 1608 to select a particular logical connection from the connection database 1620 for use in fulfilling the request. In one embodiment, the proxy server 1602 receives a request from a client computer system, and authorizes the request based on credentials received with the request. In one embodiment, the proxy server generates a corresponding set of database commands for fulfilling the request, and submits the set of database commands to a particular database server using credentials associated with the proxy server 1602.

Database servers that are accessible to the proxy server may provide an interface to a relational database using a network interface. In one embodiment, the first database server 1604 hosts a relational database service 1622 that manages a first relational database 1624. In one embodiment, the relational database service 1622 may be an instance of MySQL, SQL Server, Oracle, or other database service. In one embodiment, the first relational database 1624 retains information used by the proxy server 1602 to fulfill client requests. In one embodiment, the first database server 1604 includes a network interface 1626 which serves as an endpoint for logical connections between the proxy server 1602 and the first database server 1604.

In one embodiment, the second database server 1606 hosts a relational database service 1622 that manages a second relational database 1630. In one embodiment, the relational database service 1628 may be an instance of MySQL, SQL Server, Oracle, or other database service. In one embodiment, the second relational database 1630 retains information used by the proxy server 1602 to fulfill client requests. In one embodiment, the second database server 1606 includes a network interface 1632 which serves as an endpoint for logical connections between the proxy server 1602 and the second database server 1606.

Figure 17:
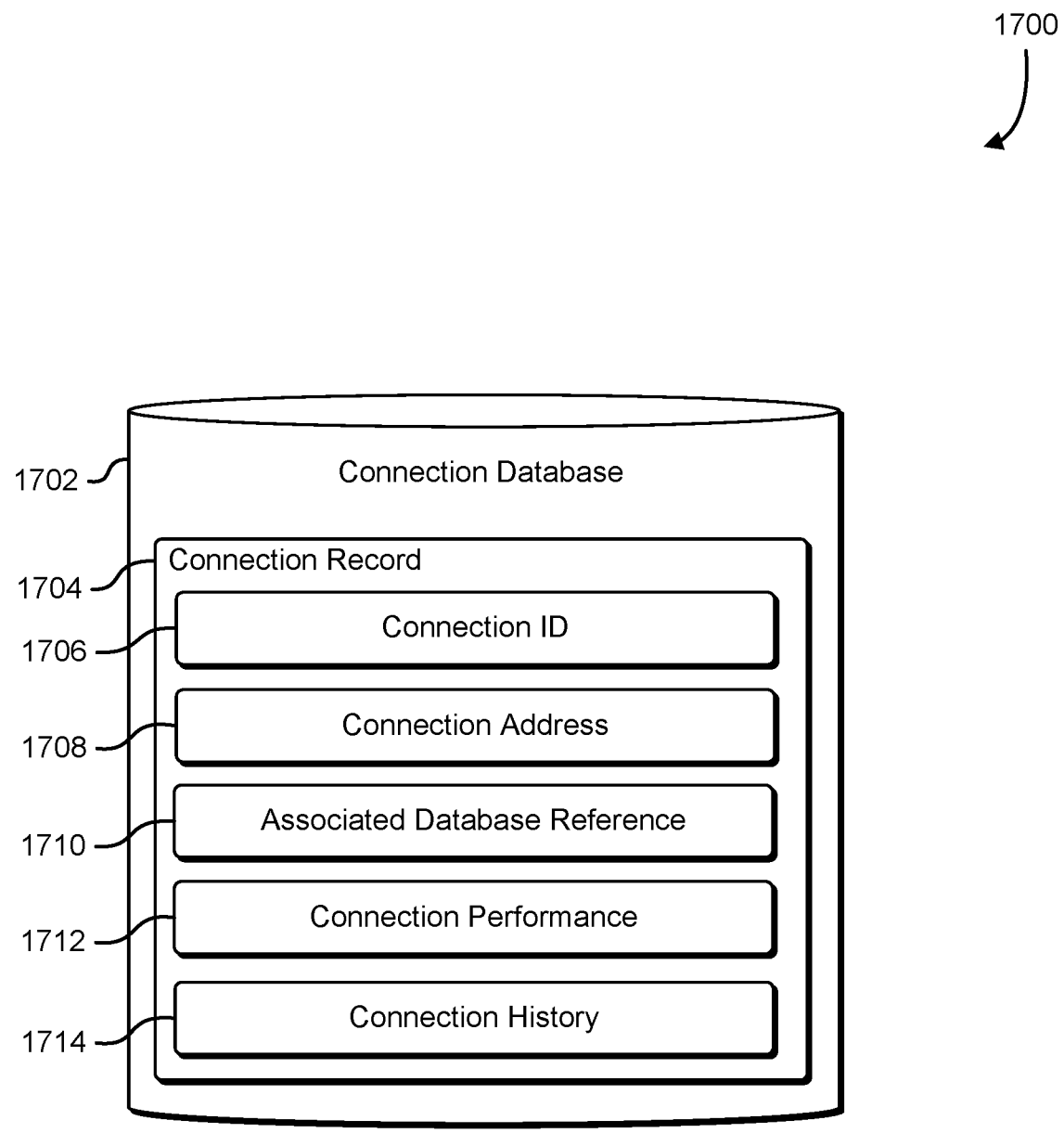
FIG. 17 shows an illustrative example of a connection database maintained by a proxy server, according to one embodiment.

FIG. 17 shows an illustrative example of a connection database maintained by a proxy server. A diagram 1700 illustrates an embodiment of a connection database 1702. In one embodiment, the connection database 1702 retains one or more connection records in an organized structure such as a tree, hash table, or a relational data store. Each connection record in the connection database 1702 may include a variety of data fields for holding information related to a particular logical connection.

In one embodiment, a connection record 1704 includes a connection ID 1706, a connection address 1708, a reference to an associated database reference 1710, and a connection performance record 1712, and a connection history 1714. The connection ID 1706 identifies a particular connection maintained by the proxy server. In one embodiment, the connection ID 1706 is a reference to a socket structure maintained by the proxy server. In one embodiment, the connection ID 1706 is a socket ID. In one embodiment, the connection ID is a URL or connection name. In one embodiment, the connection address 1708 is an IP address, an IPX address, MAC address, or other network identifier. In one embodiment, the associated database reference 1710 is a pointer or other reference to a database property record maintained by a database manager within a database proxy service. In one embodiment, the connection performance record 1712 holds information that describes the speed, backlog, and reliability of the connection. In one embodiment, the connection history 1714 retains a history of database commands that have been submitted via the connection.

Figure 18:
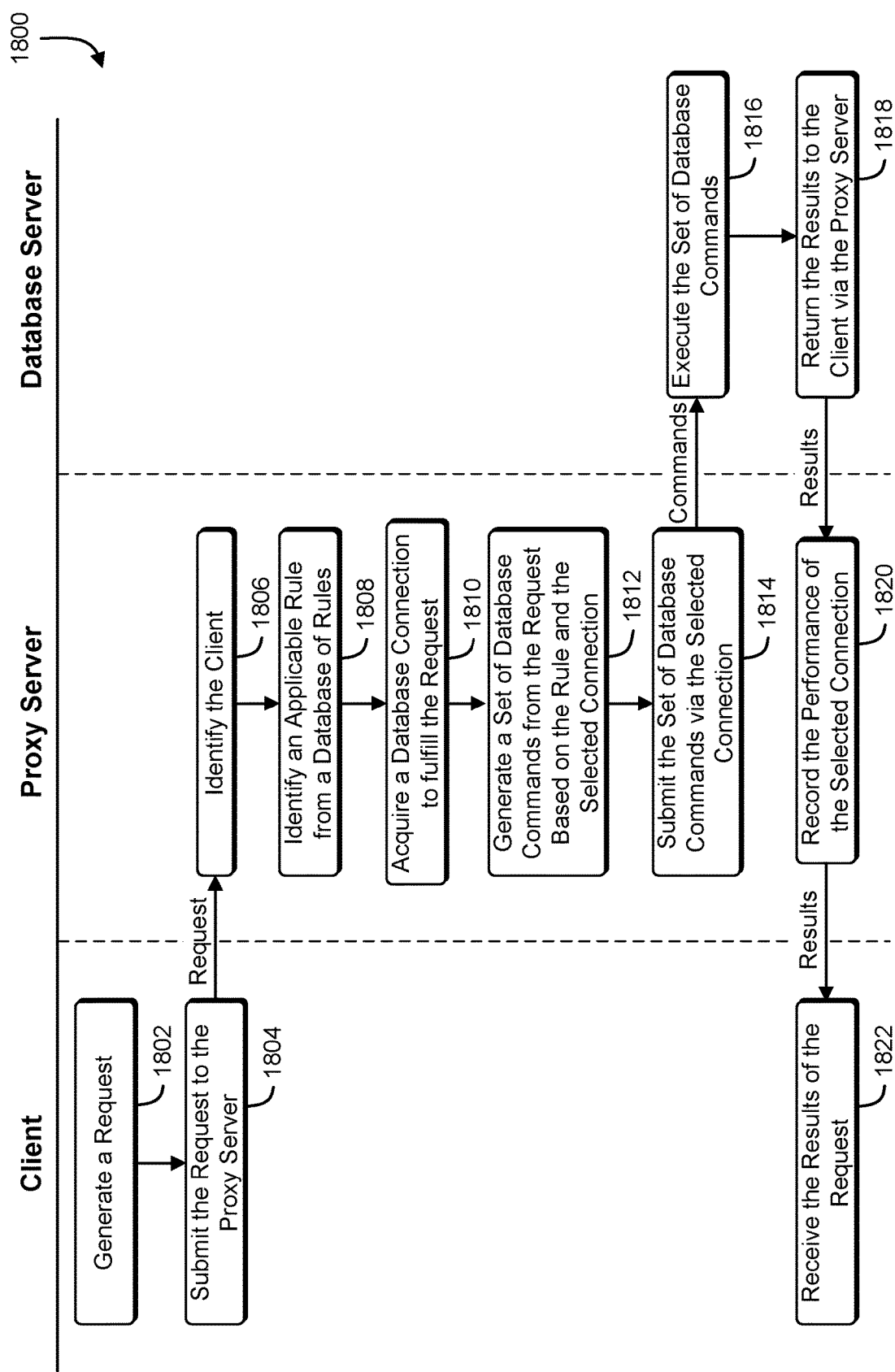
FIG. 18 shows an illustrative example of a process that, as a result of being performed by a client, a proxy server, and a database server, fulfills a request submitted by the client by submitting a corresponding set of database commands to the database server over a logical connection managed by the proxy server, according to one embodiment.

FIG. 18 shows an illustrative example of a process that, as a result of being performed by a client, a proxy server, and a database server, fulfills a request submitted by the client by submitting a corresponding set of database commands to the database server over a logical connection managed by the proxy server. A swim diagram 1800 illustrates an embodiment of a process that begins at block 1802 with the client generating a request to be performed by a database server. In one embodiment, at block 1804, the client submits the request to the proxy server. In one embodiment, the request is submitted to the proxy server over an HTTP connection as a REST request.

At block 1806, the proxy server receives the request from the client. In one embodiment, at block 1806, the proxy server verifies the identity of the client using credentials provided with the request. In one embodiment, the credentials are a digital signature generated by the client using a cryptographic key associated with the client. In one embodiment, at block 1808, the proxy server searches a database of rules and identifies a set of rules that are applicable to the request. In one embodiment, applicable rules are identified based at least in part on properties of the client and/or properties of the request. In one embodiment, at block 1810, the proxy server acquires a database connection for use when fulfilling the request. In one embodiment, the database connection is a logical network connection between the proxy server and a database service running on the database server. In one embodiment, the proxy server acquires a database connection by establishing a new logical connection to the database server. In one embodiment, the proxy server acquires a database connection by selecting a specific active logical connection from a database of active logical connections between the proxy server in the database server. In one embodiment, at block 1812, the proxy server generates a set of database commands that, when submitted to a database server, cause the database server to perform operations that fulfill the request. In one embodiment, at block 1814, the proxy server submits the set of database commands to the database server via the acquired database connection.

At block 1816, the database server receives the set of commands from the proxy server. In one embodiment, at block 1816, the database server executes the set of database commands using a database engine hosted by the database server. In one embodiment, the database server produces a set of results, and at block 1818, the database server returns the results to the proxy server via the acquired database connection.

The proxy server receives the results from the database server at block 1820. In one embodiment, the proxy server updates information stored in a connection database to reflect the commands submitted to the database, the results received from the database, the performance of the database, and the availability of the database connection for fulfilling future requests. In one embodiment, the proxy server processes the results received from the database server in accordance with one or more rules that are applicable to the request, and returns the processed results to the client. In one embodiment, the client receives the processed results from the proxy server at block 1822. In one embodiment, the processed results may be in the form of an HTTP response message.

Figure 19:
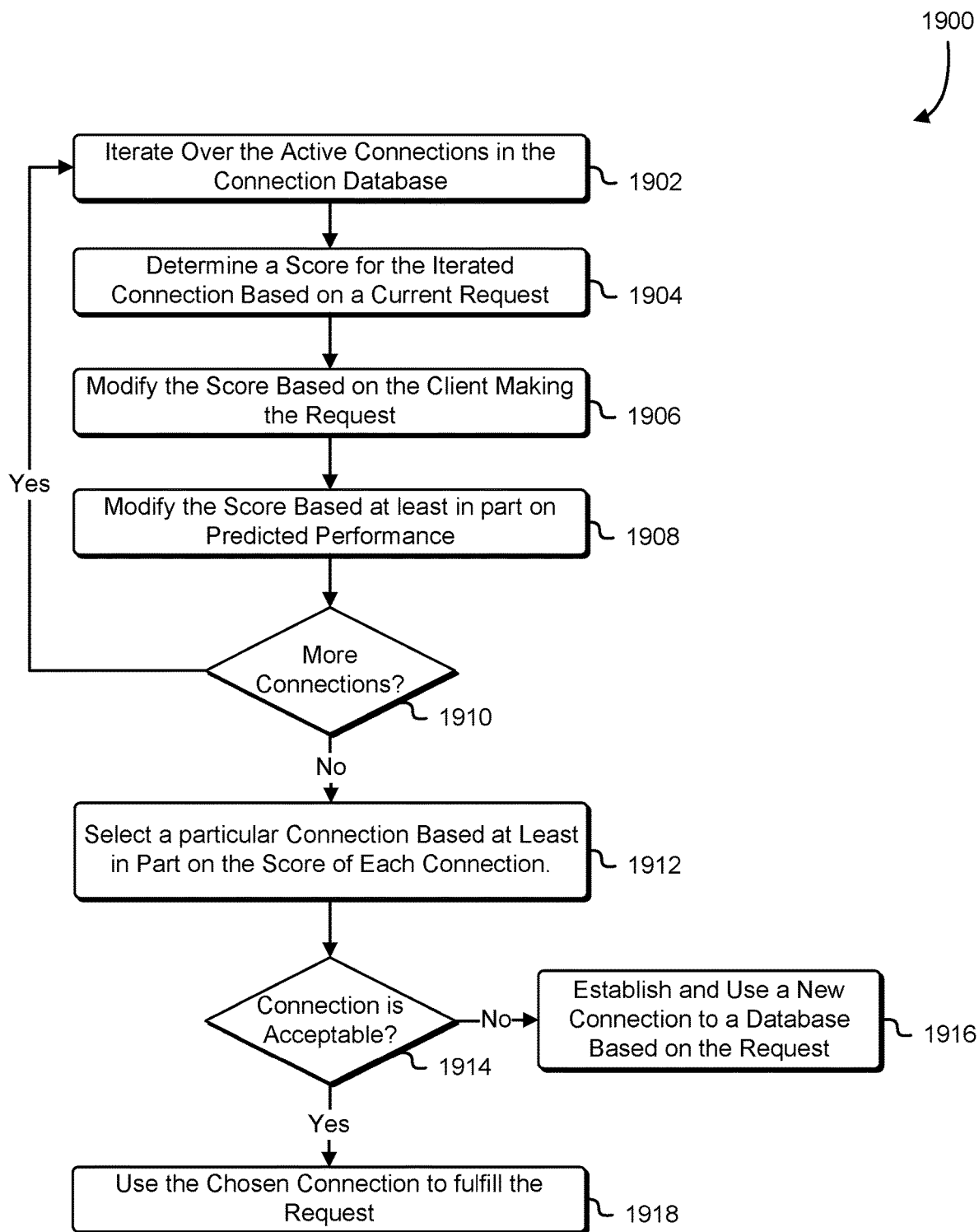
FIG. 19 shows an illustrative example of a process that, as a result of being performed by a proxy server, selects a particular logical connection to be used by the proxy server when fulfilling a particular request, according to one embodiment.

FIG. 19 shows an illustrative example of a process that, as a result of being performed by a proxy server, selects a particular logical connection to be used by the proxy server when fulfilling a particular request. A flowchart 1900 illustrates an embodiment of a process that begins at block 1902 with the proxy server initiating a loop over a set of active connections between the proxy server and a database server. In one embodiment, information describing the set of active connections is maintained in a connection database by the proxy server. In one embodiment, at block 1904, the proxy server determines a score for the iterated connection. In one embodiment, the score is based at least in part on properties of the particular request. In one embodiment, at block 1906, the proxy server modifies the score based at least in part on the identity of the client that submitted the particular request. In one embodiment, at block 1908, the proxy server modifies the score based at least in part on the predicted performance of the iterated connection. In one embodiment, at block 1910, the proxy server determines whether there are more active connections to be processed. If there are more active connections to be processed, execution returns to block 1902 and the next connection in the set of active connections is processed. If there are not more active connections to be processed, execution advances to block 1912.

After generating a score for each connection in the set of active connections, the proxy server selects 1912 a particular connection for use in fulfilling the particular request. In one embodiment, the proxy server selects the particular connection based at least in part on the score associated with each connection. In one embodiment, the proxy server selects a random connection from a subset of connections having a score greater than a threshold value, where the threshold value represents a minimum level of performance. In one embodiment, at block 1914, the proxy server determines whether an acceptable connection exists in the set of active connections. If an acceptable connection does not exist, execution advances to block 1916, and in one embodiment the proxy server establishes a new logical connection between the proxy server in the database server. In one embodiment, the new logical connection is created with operational parameters that are based at least in part on properties of the particular request. If an acceptable connection was found in the set of active connections, execution proceeds to block 1918, and the connection selected at block 1912 is used to fulfill the particular request.

Figure 20:
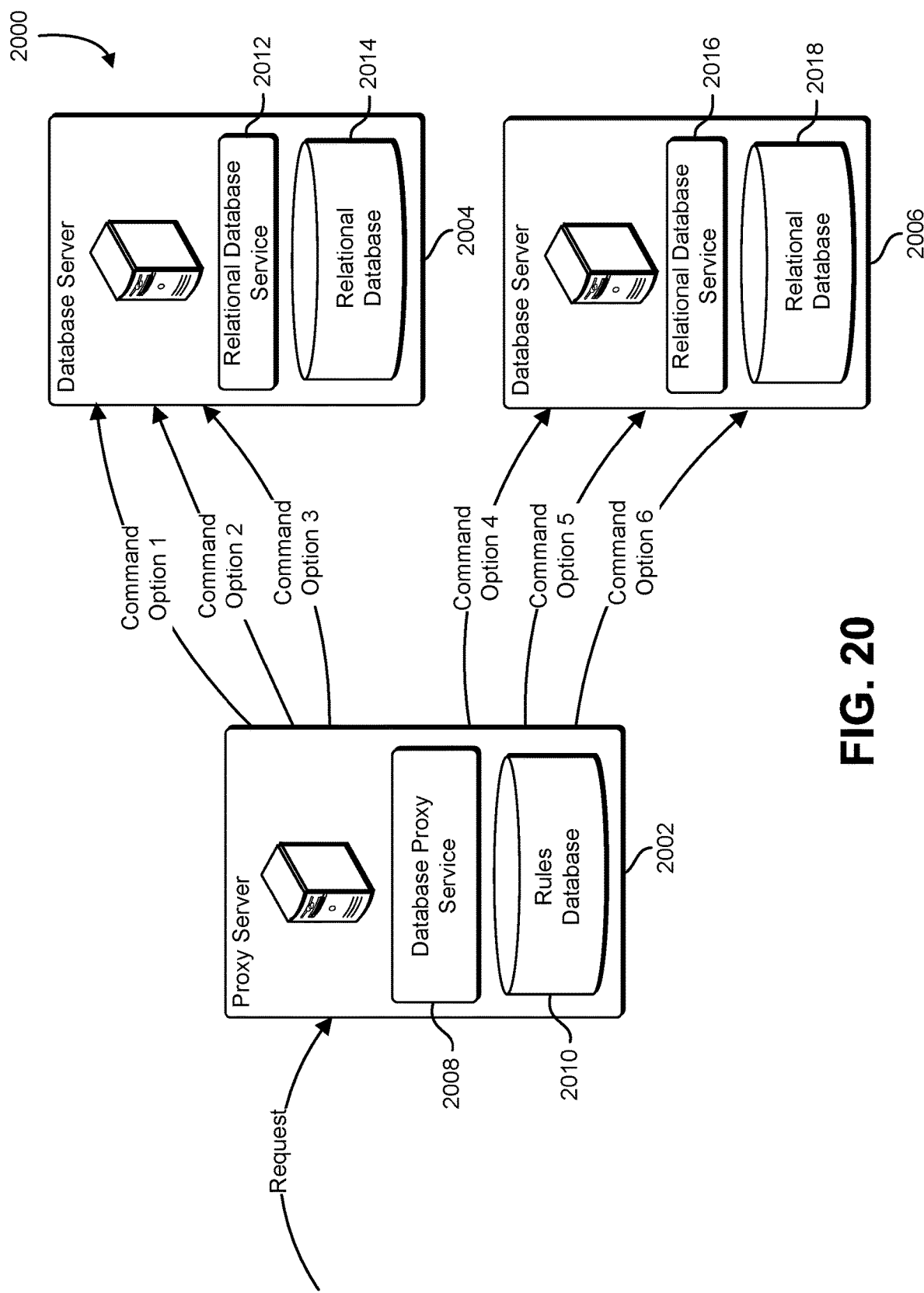
FIG. 20 shows an illustrative example of a proxy server that adjusts the performance of the proxy server by sending, for a particular request, a plurality of alternative database command sets to a number of database servers, according to one embodiment.

FIG. 20 shows an illustrative example of a proxy server that adjusts the performance of the proxy server by sending, for a particular request, a plurality of alternative database command sets to a number of database servers. A diagram 2000 illustrates an embodiment of a proxy server 2002 that adjusts the performance of the proxy server by measuring the performance of alternative database command sets. In one embodiment, the proxy server 2002 is able to access the first database server 2004 and a second database server 2006. Each available data server may operate in accordance with different sets of operational parameters. In one embodiment, the proxy server 2002 hosts a database proxy service 2008 that is configured using a rules database 2010. In one embodiment, when the proxy server 2002 receives a request from a client computer system, the proxy server 2002 searches the rules database 2010 for a set of applicable rules, applies the rules to the incoming request, and produces one or more sets of alternative database commands that can be submitted to a database server to fulfill the request.

The first database server 2004 hosts a first relational database service 2012 that manages a first relational database 2014. The second database server 2006 hosts a second relational database service 2016 that manages a second relational database 2018. In one embodiment, the proxy server 2002 submits a particular base command set to both the first database server 2004 and the second database server 2006, and measures the relative performance of each database server. In one embodiment, based at least in part on the measured relative performance, the proxy server defines a relative preference between the first database server 2004 and the second database server 2006.

In one embodiment, the proxy server 2002 sends a plurality of alternative command sets having alternative command characteristics to a particular database server. The particular database server processes each alternative command set in the plurality of alternative command sets. In one embodiment, the proxy server 2002 measures the relative performance of each of the plurality of alternative command sets, and based on the relative performance of each of the plurality of alternative command sets, the proxy server 2002 determines a preferred set of command characteristics that will be applied when generating future database command sets.

Figure 21:
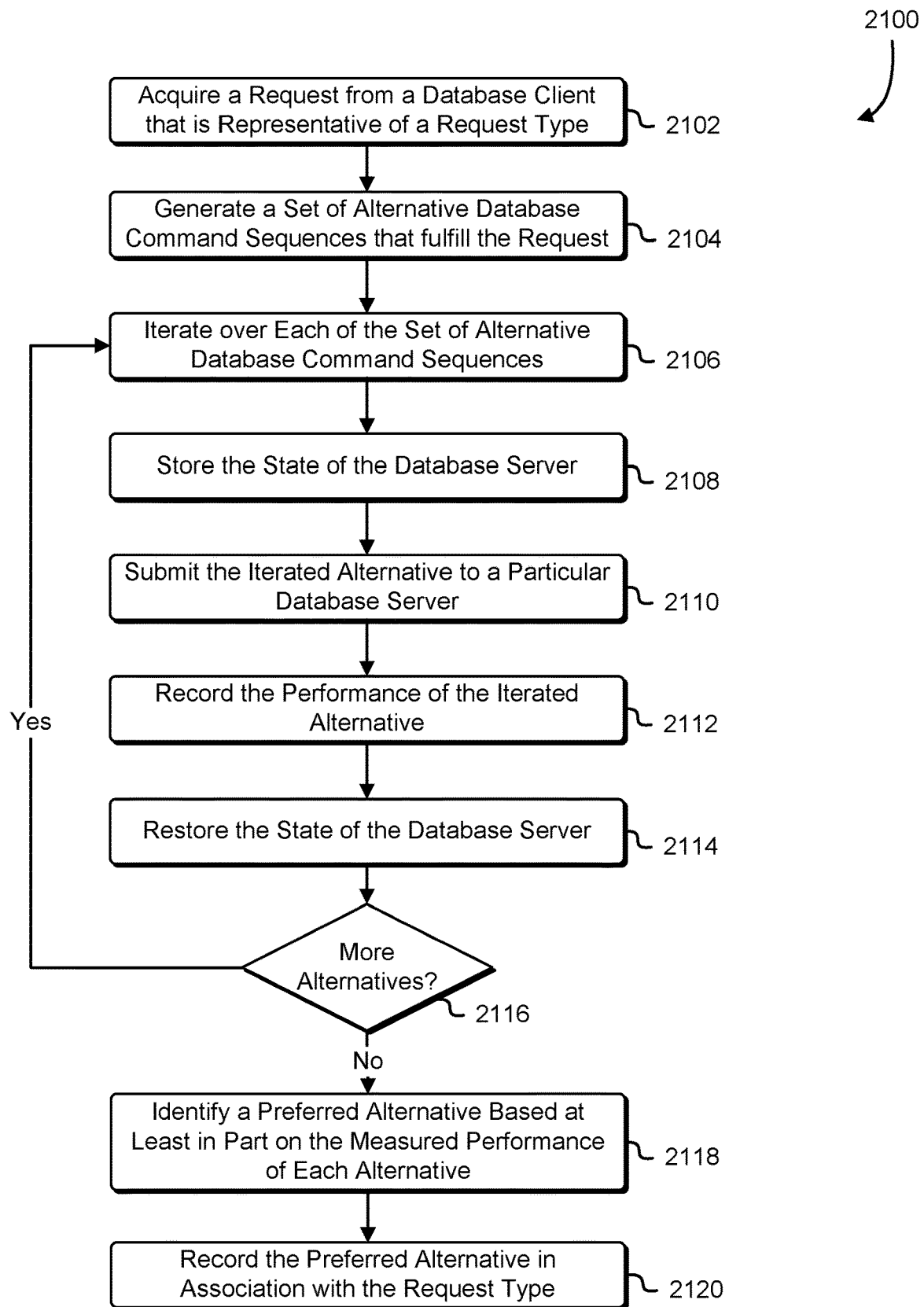
FIG. 21 shows an illustrative example of a process that, as a result of being performed by a proxy server, measures the relative performance of a number of alternative database command sequences to determine how database command sequences are generated for a particular type of request, according to one embodiment.

FIG. 21 shows an illustrative example of a process that, as a result of being performed by a proxy server, measures the relative performance of a number of alternative database command sequences to determine how database command sequences are generated for a particular type of request. A particular type of request may be, for example, query requests from a particular table, sort requests, or multi-table join requests. A flowchart 2100 illustrates an embodiment of a process that begins at block 2102 with a proxy server acquiring a request from a database client where the request is representative of a particular type of request. In one embodiment, at block 2104, the proxy server generates a set of alternative database command sequences. Each alternative database command sequence may be constructed according to a different design principle. Design principles may include reindexing a data table before performing a query, using stored procedures, or breaking a complex operation into a larger number of discrete database commands. In one embodiment, the proxy server selects a destination database server from one or more available database servers to act as a test platform.

At block 2106, the proxy server initiates a loop that iterates over each command sequence in the set of alternative database command sequences. In one embodiment, at block 2108, the proxy server retrieves and stores the state of the destination database server. In one embodiment, the proxy server sends a command to the destination database server that blocks the commitment of database changes. In one embodiment, the proxy server sends a command to the destination database server that captures a snapshot of the state of the destination database server. In one embodiment, at block 2110, the proxy server submits the iterated command sequence to the destination database server, and the destination database server executes the iterated command sequence. In one embodiment, at block 2112, the proxy server measures the performance of the destination database server when executing the iterated command sequence, and records the measured performance in a performance log. In one embodiment, at block 2114, the proxy server restores the state of the database server using the stored state information saved at block 2108. In one embodiment, the proxy server restores the destination database server by restoring the state of the database using a snapshot. In one embodiment, the proxy server restores the state of the destination database by restoring a backup of the destination database server.

At decision block 2116, the proxy server determines whether there are additional alternatives in the set of alternative database command sequences. If there are additional alternatives in the set of alternative database command sequences, execution returns to block 2106 and the next alternative command sequence in the set of alternative database command sequences is tested. If there are not additional alternatives in a set of alternative database command sequences, execution advances to block 2118. In one embodiment, at block 2118, the proxy server selects a preferred alternative command sequence based at least in part on the performance information contained in the performance log. In one embodiment, the proxy server selects the fastest alternative command sequence as the preferred alternative. In one embodiment, the proxy server selects the alternative command sequence that is the lowest processing cost as the preferred alternative. In one embodiment, at block 2120, the proxy server stores a record of the preferred alternative command sequence and the design principle embodied by the preferred alternative command sequence in association with the request type. In one embodiment, if the proxy server receives a new request that matches the request, the proxy server uses the preferred alternative command sequence to fulfill the request. In one embodiment, if the proxy server receives a new request having a request type that matches the type of the request, the proxy server applies a design principle associated with the preferred alternative command sequence to the generation of a new command sequence for satisfying the new request.

Figure 22:
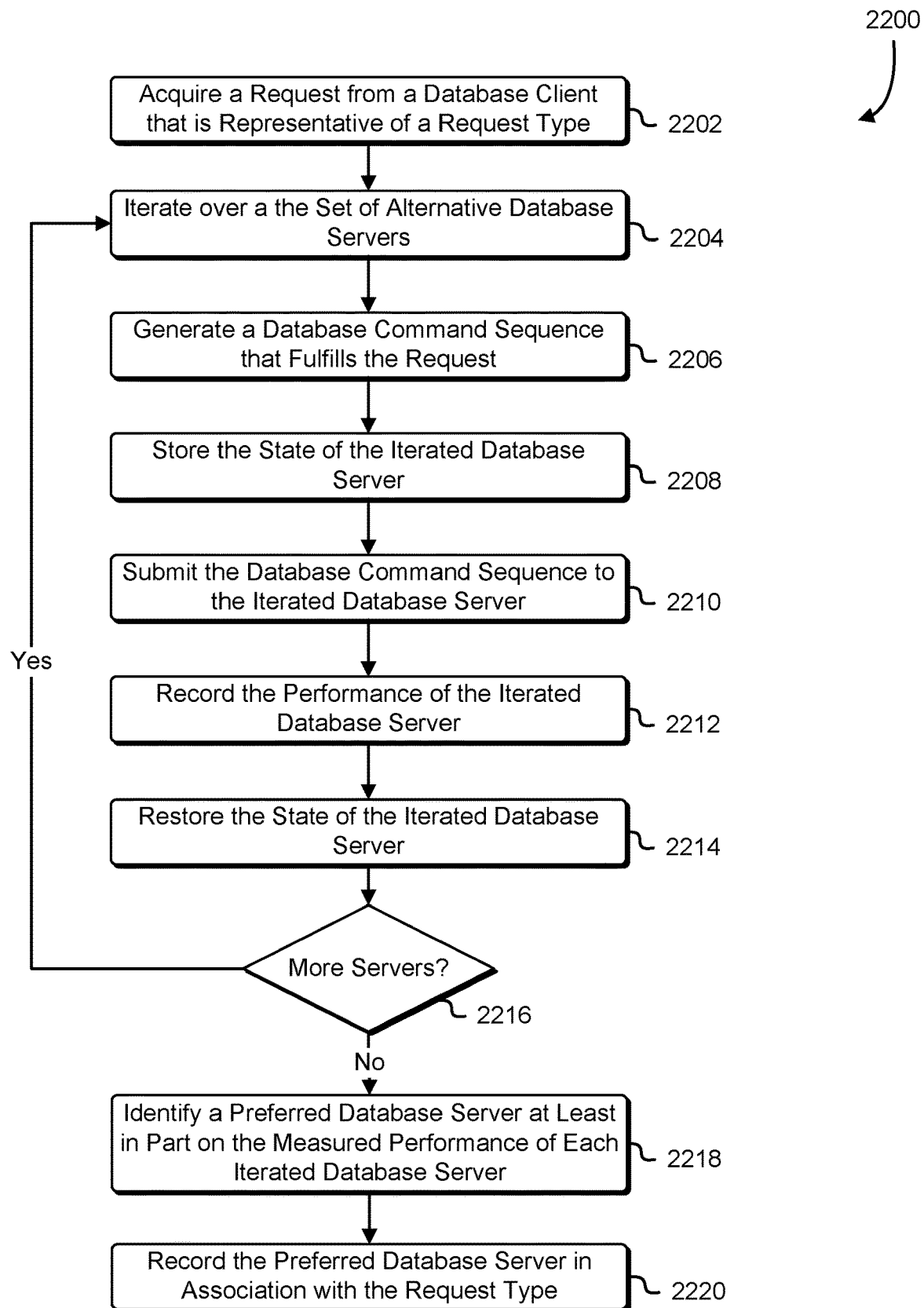
FIG. 22 shows an illustrative example of a process that, as a result of being performed by a proxy server, measures the relative performance of a number of alternative database servers to determine where database commands associated with a particular type of request are routed, according to one embodiment.

FIG. 22 shows an illustrative example of a process that, as a result of being performed by a proxy server, measures the relative performance of a number of alternative database servers to determine where database commands associated with a particular type of request are routed. A flowchart 2200 illustrates an embodiment of a process that begins at block 2202 with a proxy server acquiring a request from a database client where the request is representative of a particular request type. In one embodiment, the process identifies a preferred database server for use with future requests that match the request. In one embodiment, the process identifies a preferred database server for use with future requests having the same request type as the request.

At block 2204, the proxy server initiates a loop that iterates over each database server in a set of available alternative database servers. In one embodiment, the set of available alternative database servers is retrieved from a database maintained by the proxy server. In one embodiment, at block 2206, the proxy server generates a database command sequence capable of fulfilling the request when submitted to the iterated database server. In one embodiment, the database command sequence is based at least in part on the request. In one embodiment, the database command sequence is based at least in part on the iterated database server. In one embodiment, the database command sequence is based at least in part on the software type and version of the database service hosted by the iterated database server.

The proxy server tests the performance of the database command sequence on the iterated server. In one embodiment, at block 2208, the proxy server stores the state of the iterated database server. In one embodiment, the proxy server configures the database server so that changes to the database that are caused by the database command sequence are not committed permanently to the database. In one embodiment, the proxy server causes the database server to capture a snapshot of the state of the database. In one embodiment, at block 2210, the proxy server submits the database command sequence to the iterated database server, causing the iterated database server to execute the database command sequence. In one embodiment, the proxy server records 2212 the performance of the iterated database server executing the database command sequence. In one embodiment, the proxy server records an amount of time associated with executing the database command sequence on the iterated database server. In one embodiment, the proxy server determines a cost associated with executing the database command sequence on the iterated database server. In one embodiment, the proxy server stores the performance and/or cost information in association with information that identifies the iterated database server. In one embodiment, at block 2214, the proxy server restores the state of the iterated database server using the state information saved at block 2208. In one embodiment, the proxy server stores the saved state information to the iterated database server. In one embodiment, the proxy server causes the iterated database server to restore the saved state information using a snapshot.

At decision block 2216, the proxy server determines whether there are additional database servers to be iterated from the set of available alternative database servers. If there are additional database servers to be iterated from the set of available alternative database servers, execution returns to block 2204 where the proxy server begins processing an additional database server. If there are not additional database servers to be iterated from the set of available alternative database servers, execution advances to block 2218. In one embodiment, at block 2218, the proxy server selects a preferred alternative database server based at least in part on the recorded performance information associated with each iterated database server. In one embodiment, the proxy server selects the database server that is able to process the database command sequence the fastest as the preferred alternative. In one embodiment, the proxy server selects the database server having the lowest processing cost as the preferred alternative. In one embodiment, at block 2220, the proxy server stores a record of the preferred database server in association with the request and/or request type. In one embodiment, if the proxy server receives a new request that matches the request, the proxy server uses the preferred database server to process a database command sequence associated with the request. In one embodiment, if the proxy server receives a new request having a request type that matches the type of the request, the proxy server uses the preferred database server to process a command sequence associated with the new request.

Figure 23:
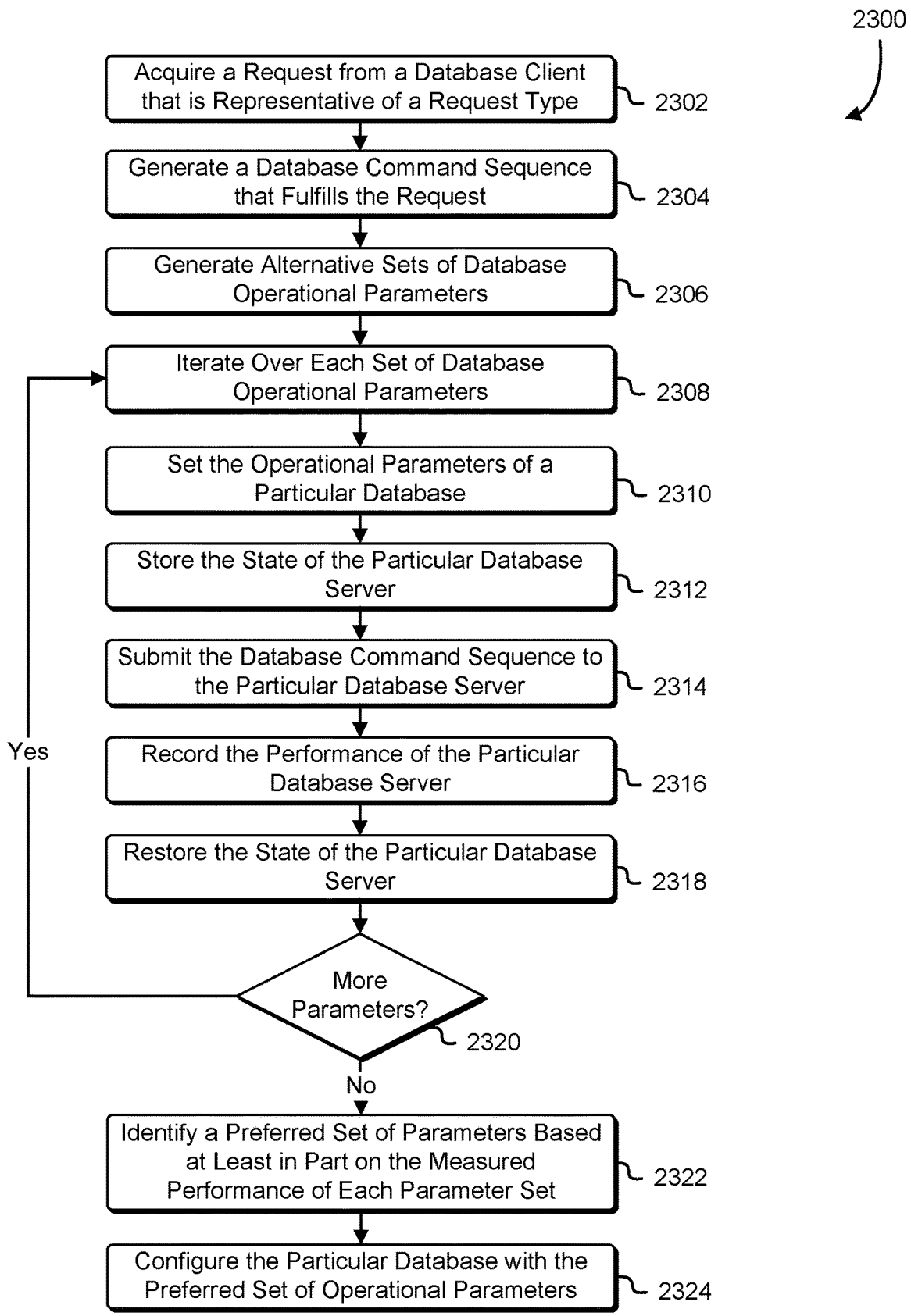
FIG. 23 shows an illustrative example of a process that, as a result of being performed by a messaging system, replays a sequence of commands to a particular database using a number of different database parameters to identify a preferred set of parameters for the particular database, according to one embodiment.

FIG. 23 shows an illustrative example of a process that, as a result of being performed by a messaging system, replays a sequence of commands to a particular database using a number of different database parameters to identify a preferred set of parameters for the particular database. A flowchart 2300 illustrates an embodiment of a process that begins at block 2302 with a proxy server acquiring a request from a database client that is representative of a particular type of request. In one embodiment, at block 2304, the proxy server generates a database command sequence that, when executed on a database server, performs operations that at least in part fulfill the request. In one embodiment, at block 2306, the proxy server generates one or more sets of operational parameters that may be applied to the database server. In one embodiment, the operational parameters may include memory cache parameters, cache size parameters, queue length parameters, data modification commitment parameters, index handling parameters, or limits on the number of simultaneous connections to the database.

At block 2308, the proxy server initiates a loop that iterates over each set of operational parameters in the sets of operational parameters. In one embodiment, at block 2310, the proxy server applies an iterated set of operational parameters to the database. In one embodiment, the proxy server tests the performance of the database command sequence on the iterated server while the iterated server is configured with the iterated set of operational parameters. In one embodiment, at block 2312, the proxy server stores the state of the iterated database server. In one embodiment, the proxy server configures the database server so that changes to the database that are caused by the database command sequence are not committed permanently to the database. In one embodiment, the proxy server causes the database server to capture a snapshot of the state of the database. In one embodiment, at block 2314, the proxy server submits the database command sequence to the iterated database server, causing the iterated database server to execute the database command sequence. In one embodiment, the proxy server records 2316 the performance of the iterated database server executing the database command sequence. In one embodiment, the proxy server records an amount of time associated with executing the database command sequence on the iterated database server. In one embodiment, the proxy server determines a cost associated with executing the database command sequence on the iterated database server. In one embodiment, the proxy server stores the performance and/or cost information in association with information that identifies the iterated set of operational parameters. In one embodiment, at block 2318, the proxy server restores the state of the iterated database server using the state information saved at block 2312. In one embodiment, the proxy server stores the saved state information to the iterated database server. In one embodiment, the proxy server causes the iterated database server to restore the saved state information using a snapshot.

At decision block 2320, the proxy server determines whether there is an additional set of operational parameters to be iterated from the sets of operational parameters. If there is an additional set of operational parameters to be iterated from the sets of operational parameters, execution returns to block 2308 and the proxy server evaluates an additional set of operational parameters. If there is not an additional set of operational parameters to be iterated from the sets of operational parameters, execution advances to block 2322. In one embodiment, at block 2322, the proxy server selects a preferred set of operational parameters based at least in part on the recorded performance information associated with each set of operational parameters. In one embodiment, the proxy server selects the set of operational parameters that results in the fastest processing of the database command sequence. In one embodiment, the proxy server selects the set of operational parameters that results the lowest processing cost for the database command sequence. In one embodiment, at block 2324, the proxy server applies the preferred set of operational parameters to the database server.

Figure 24:
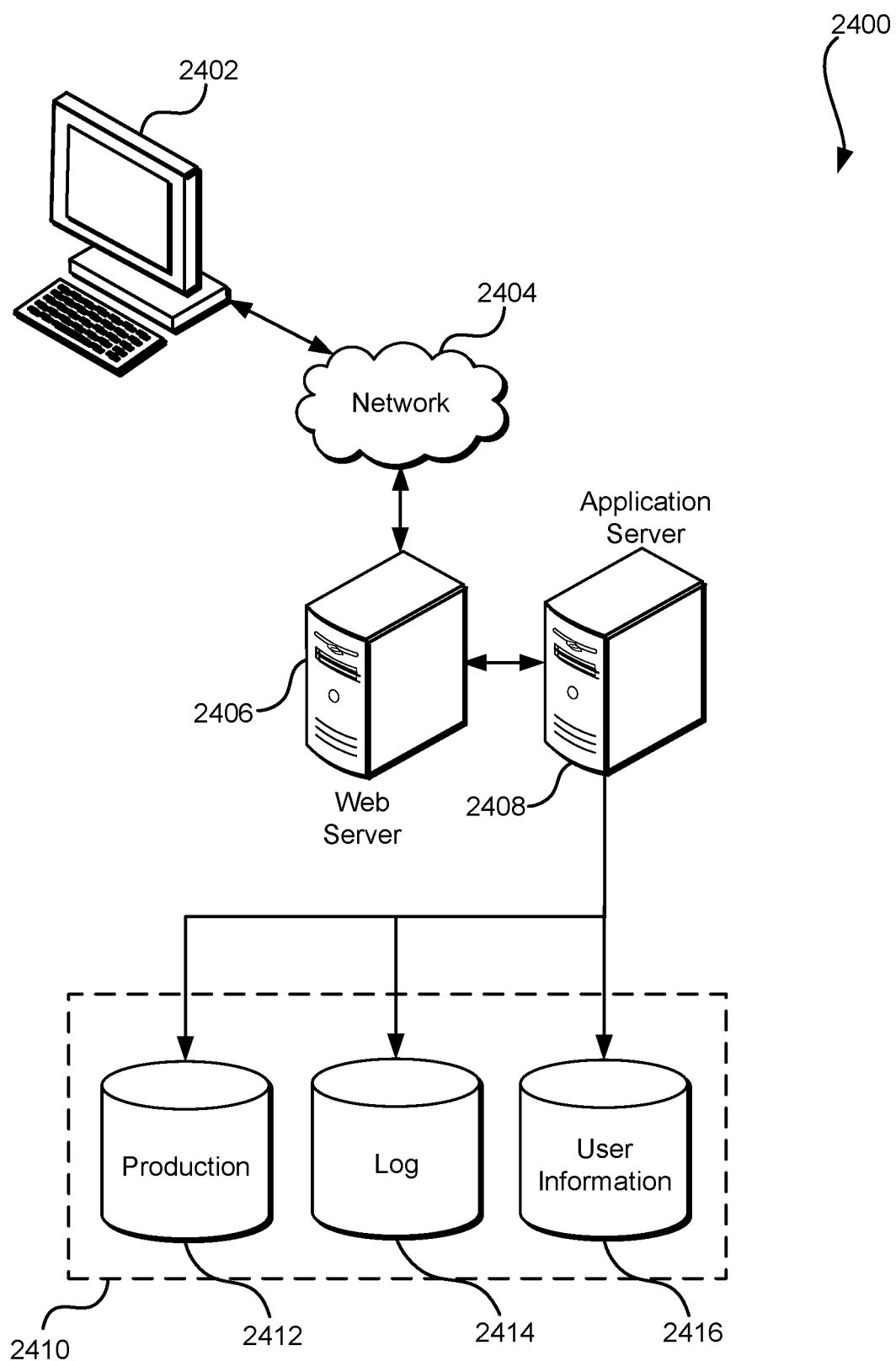
FIG. 24 illustrates implemented system, according to one embodiment.

FIG. 24 illustrates an environment 2400 for implementing aspects in accordance with one embodiment. In one embodiment, a web-based environment is used. The environment includes an electronic client device 2402, which can include any appropriate device operable to send and/or receive requests, messages, or information over an appropriate network 2404 and, in one embodiment, convey information back to a user of the device. In one embodiment, client devices include personal computers, cell phones, handheld messaging devices, laptop computers, tablet computers, set-top boxes, personal data assistants, embedded computer systems, electronic book readers, and the like. In one embodiment, the network includes any appropriate network, including an intranet, the Internet, a cellular network, a local area network, a satellite network, or any other such network and/or combination thereof. In one embodiment, components used for such a system can depend at least in part on the type of network and/or environment selected. In one embodiment, communication over the network can be enabled by wired or wireless connections and combinations thereof. In one embodiment, the network includes the Internet and/or publicly addressable communications network, as the environment includes a web server 2406 for receiving requests and serving content in response thereto. In one embodiment, an alternative device serving a similar purpose is used for other networks.

In one embodiment, the illustrative environment includes at least one application server 2408 and a data store 2410. In one embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In one embodiment, the application server can include any appropriate hardware, software, and firmware that integrates with the data store as needed to execute aspects of one or more applications for the client device, handling some or all of the data access and business logic for an application. In one embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the client device to provide the content in one or more forms including, but not limited to, forms that are perceptible to the user audibly, visually, and/or through other senses. In one embodiment, the handling of requests and responses, and the delivery of content between the client device 2402 and the application server 2408, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In one embodiment, the data store 2410 includes several separate data tables, databases, data documents, dynamic data storage schemes, and/or other data storage mechanisms and media for storing data relating to a particular aspect of the present disclosure. In one embodiment, the data store illustrated includes mechanisms for storing production data 2412 and user information 2416, which can be used to serve content for the production side. In one embodiment, the data store is shown to include a mechanism for storing log data 2414, which can be used for reporting, analysis, or other such purposes. In one embodiment, other aspects may be stored in the data store, such as page image information and access rights information, which can be stored in any of the above listed mechanisms as appropriate or in additional mechanisms in the data store 2410. In one embodiment, the data store 2410 is operable, through logic associated therewith, to receive instructions from the application server 2408 and obtain, update or otherwise process data in response thereto. In one embodiment, the application server 2408 provides static, dynamic, or a combination of static and dynamic data in response to the received instructions. In one embodiment, dynamic data, such as data used in web logs (blogs), shopping applications, news services, and other such applications is generated by server-side structured languages as described herein or may be provided by a content management system ("CMS") operating on, or under the control of, the application server. In one embodiment, a user, through a device operated by the user, submits a search request for a certain type of item, and the data store accesses the user information to verify the identity of the user and can access the catalog detail information to obtain information about items of that type, and then the information is returned to the user. In one embodiment, the information is returned as a results listing on a web page that the user is able to view via a browser on the client device 2402. In one embodiment, information for a particular item of interest is viewed in a dedicated page or window of the browser. The present disclosure is not limited to the context of web pages, and may be applicable to processing requests in general where the requests are not requests for content.

In one embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. In one embodiment, such a system could have a fewer or a greater number of components than are illustrated in FIG. 24. Thus, the depiction of the system 2400 in FIG. 24 should be taken as being illustrative in nature and not limiting to the scope of the disclosure.

An embodiment can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In one embodiment, the protocol is a reliable connection-oriented protocol such as TCP. In one embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In one embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In one embodiment, the server(s) include one or more database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. In one embodiment, these reside in a variety of locations, such as on a storage medium local to (and/or resident in) one or more of the computers or remote from any or all of the computers across the network. In one embodiment, the information may reside in a storage-area network ("SAN") familiar to those skilled in the art. In one embodiment, files for performing the functions attributed to the computers, servers, or other network devices may be stored locally and/or remotely, as appropriate. In one embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices include a number of software applications, modules, services, or other elements located within at least one working memory device, including an operating system and application programs, such as a client application or web browser. In one embodiment, customized hardware is used and/or particular elements are implemented in hardware, software (including portable software, such as applets), or both. In one embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device.

In the preceding and following description, various techniques are described. For purposes of explanation, specific configurations and details are set forth in order to provide a thorough understanding of possible ways of implementing the techniques. However, the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. Various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain embodiments thereof are shown in the drawings and have been described above in detail. There is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed material (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In one embodiment, the code is stored on a computer-readable storage medium in the form of a computer program comprising a plurality of instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in one embodiment, the executable instructions are executed such that different instructions are executed by different processors. In one embodiment, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in one embodiment, computer systems are configured to implement one or more services that singly or collectively perform operations of processes described herein. Such computer systems may, for instance, be configured with applicable hardware and/or software that enable the performance of the operations. In one embodiment, a computer system is a single device. In one embodiment, a computer system is a distributed computer system comprising multiple devices that operate such that the distributed computer system performs the described operations and a single device might not perform all of the described operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art on reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:
1. A computer-implemented method, comprising:
receiving, via a representational state transfer ("REST") interface hosted by a proxy server computer system, a request to perform a database operation;
obtaining a logical connection to a relational database server, the logical connection selected from a plurality of logical connections based at least in part on a score of the logical connection, the score based at least in part on an identity of a client that submitted the request to perform a database operation;
authorizing access to the relational database server via the logical connection using authentication information included with the request, the authentication information including a digital signature generated, by the client that submitted the request to perform the database operation, using a cryptographic key associated with the client;

generating a command that, as a result of being executed by the relational database server, performs the database operation;

submitting the command to the relational database server via the logical connection; and as a result of determining that execution of the command on the relational database server failed, submitting the command to a different relational database server without notifying a requester of the failure.

2. The computer-implemented method of claim 1, wherein:

the request is provided to the proxy server computer system by a client computer system via a hypertext transport protocol connection; and the proxy server computer system receives a set of results from the relational database server as a result of submitting the command.

3. The computer-implemented method of claim 2, wherein:

the proxy server computer system generates a hypertext transport protocol connection response from the set of results; and the hypertext transport protocol connection response is returned to the client computer system via the hypertext transport protocol connection.

4. The computer-implemented method of claim 3, wherein:

the request is submitted to the proxy server computer system as a hypertext transport protocol connection POST request; and the hypertext transport protocol connection POST request includes a request body that includes at least one parameter.

5. A system, comprising:

one or more processors; and memory to store computer-executable instructions that, if executed, cause the one or more processors to:

receive, from a requester, a Web request via a Web service interface;

acquire a connection to a database server, the connection selected from a plurality of connections based at least in part on a score of the connection, the score based at least in part on a cost metric associated with the logical connection;

generate one or more database commands based at least in part on the request;

authorize access to the database server using authentication information including a digital signature associated with a proxy server;

attempt to fulfill the request by submitting the one or more database commands to the database server via the connection; and as a result of determining that execution of at least one of the one or more database commands failed on the database server, continue to process the request by submitting the at least one of the one or more database commands to a different database server.

6. The system of claim 5, wherein:

the request is submitted by a client computer system within a hypertext transport protocol connection GET request; and the hypertext transport protocol GET request includes at least one parameter in an associated URL.

7. The system of claim 6, wherein the computer-executable instructions further cause the one or more processors to:

receive a result from the database server via the connection; and return, to the client computer system, a response that is based at least in part on the result.

8. The system of claim 7, wherein:

the response is a hypertext transport protocol response;

the response identifies a hypertext transport protocol version; and the response includes a response code and a response header.

9. The system of claim 8, wherein:

the response includes a body; and the body includes information that is based at least in part on the result received from the database server.

10. The system of claim 5, wherein the Web service interface is a representational state transfer ("REST") interface.

11. The system of claim 5, wherein the Web request includes:

a verb;

a uniform resource locator;

a hypertext transport protocol version information; and a hypertext transport protocol request header.

12. The system of claim 11, wherein:

the web request includes a hypertext transport protocol request body; and the verb identifies the web request as one of GET, POST, PUT, or DELETE.

13. A non-transitory computer-readable storage medium having stored thereon executable instructions that, as a result of being executed by one or more processors of a computer system, cause the computer system to at least:

receive, from an application, a Web request via a network port of a network interface connected to the computer system;

acquire a connection to a database server, the connection selected based at least in part on a score of the connection, the score comprising a preference score assigned to the connection by an administrator;

authorize access to the database server using authentication information generated based at least in part on a cryptographic key associated with a requestor of the Web request;

generate a set of database commands that as a result of being executed by a database server, fulfill the Web request;

submit the set of database commands to the database server via the connection; and as a result of determining that execution of the set of database commands failed on the database server, submit the set of database commands to a different database server while masking the failure from the application.

14. The non-transitory computer-readable storage medium of claim 13, wherein:

the instructions further comprise instructions that, as a result of being executed by the one or more processors, cause the computer system to determine that the Web request is authorized based at least in part on authentication information associated with the web request; and the set of database commands is submitted to the database over the connection using credentials associated with the computer system.

15. The non-transitory computer-readable storage medium of claim 14, wherein:
the Web request includes a header portion; and
the authentication information is included in the header portion of a hypertext transport protocol request.

16. The non-transitory computer-readable storage medium of claim 13, wherein:
the Web request includes a set of structured query language statements;
the set of database commands includes the set of structured query language statements; and
the computer system causes the set of structured query language statements to be performed by the database server.

17. The non-transitory computer-readable storage medium of claim 13, wherein the instructions further comprise instructions that, as a result of being executed by the one or more processors, cause the computer system to:
receive a result from the database server via the connection;
generate a Web response based at least in part on the result; and
provide the Web response as a response to the Web Request.

18. The non-transitory computer-readable storage medium of claim 17, wherein:
the response is a hypertext transport protocol response;
the response identifies a hypertext transport protocol version; and
the response includes a response code and a response header.

19. The non-transitory computer-readable storage medium of claim 18, wherein:
the response includes a body; and
the body includes information that is based at least in part on the result received from the database server.

20. The non-transitory computer-readable storage medium of claim 18, wherein:
the database server provides a status to the computer system in response to executing the set of database commands; and
the response code is based on the status.

* * * * *